(12) United States Patent
Sain-Thomason

(10) Patent No.: US 12,454,377 B2
(45) Date of Patent: Oct. 28, 2025

(54) METHODS AND APPARATUS FOR RECLAIMING OIL FROM VAPORIZER CARTRIDGES AND FILLING VAPORIZER CARTRIDGES

(71) Applicant: VPR BRANDS, LP, Sunrise, FL (US)

(72) Inventor: Cliff Sain-Thomason, Grants Pass, OR (US)

(73) Assignee: VPR BRANDS, LP, Sunrise, FL (US)

( * ) Notice: Subject to any disclaimer, the term of this patent is extended or adjusted under 35 U.S.C. 154(b) by 0 days.

(21) Appl. No.: 18/665,205

(22) Filed: May 15, 2024

(65) Prior Publication Data
US 2024/0300683 A1    Sep. 12, 2024

Related U.S. Application Data

(63) Continuation-in-part of application No. 17/486,469, filed on Sep. 27, 2021, now Pat. No. 12,017,262.

(51) Int. Cl.
| | |
|---|---|
| *B65B 3/04* | (2006.01) |
| *B09B 3/00* | (2022.01) |
| *B09B 101/02* | (2022.01) |

(52) U.S. Cl.
CPC .......... *B65B 3/04* (2013.01); *B09B 3/00* (2013.01); *B09B 2101/02* (2022.01)

(58) Field of Classification Search
CPC ......... B65B 3/04; B09B 3/00; B09B 2101/02; A24F 40/70; A24F 40/10
See application file for complete search history.

(56) References Cited

U.S. PATENT DOCUMENTS

| | | | |
|---|---|---|---|
| 4,665,958 A | 5/1987 | Holloway et al. | |
| 4,832,095 A | 5/1989 | Bonnell | |
| 5,269,354 A | 12/1993 | Koberg | |
| D390,420 S * | 2/1998 | Rapaz | D7/700 |
| 6,405,765 B1 | 6/2002 | Handrick | |
| 7,040,357 B1 * | 5/2006 | Volkers | B67C 9/00 |
| | | | 141/366 |

OTHER PUBLICATIONS

United States Patent and Trademark Office, "Requirement for Restriction/Election," issued in connection with U.S. Appl. No. 17/486,469, dated Jan. 29, 2024, 6 pages.

(Continued)

*Primary Examiner* — Jason K Niesz
(74) *Attorney, Agent, or Firm* — Hanley, Flight & Zimmerman, LLC

(57) ABSTRACT

Methods and apparatus for reclaiming oil from vaporizer cartridges and filling vaporizer cartridges are disclosed herein. An example apparatus includes a plate having a top side, a bottom side opposite the top side, and a threaded opening extending into the top side of the plate. The threaded opening is sized to receive a threaded extension on a vaporizer cartridge such that the vaporizer cartridge can be screwed into the threaded opening and held on the plate while a mouthpiece of the vaporizer cartridge is removed. The plate also has a drain opening extending through the plate between the top side and the bottom side. At least a portion of the drain opening is sized to receive a reservoir casing of the vaporizer cartridge such that the reservoir casing can be inserted into the drain opening in an upside-down orientation.

20 Claims, 16 Drawing Sheets

(56) References Cited

OTHER PUBLICATIONS

United States Patent and Trademark Office, "Non-Final Office Action," issued in connection with U.S. Appl. No. 17/486,469, dated Feb. 15, 2024, 7 pages.
United States Patent and Trademark Office, "Notice of Allowance and Fee(s) Due," issued in connection with U.S. Appl. No. 17/486,469, dated Apr. 19, 2024, 8 pages.

* cited by examiner

METHODS AND APPARATUS FOR RECLAIMING OIL FROM VAPORIZER CARTRIDGES AND FILLING VAPORIZER CARTRIDGES

RELATED APPLICATION

This patent arises from a continuation-in-part of U.S. application Ser. No. 17/486,469, titled "Methods and Apparatus for Reclaiming Oil From Vaporizer Cartridges and Filling Vaporizer Cartridges," filed Sep. 27, 2021, which is hereby incorporated by reference in its entirety.

FIELD OF THE DISCLOSURE

This disclosure relates generally to vaporizer cartridges and, more particularly, to methods and apparatus for reclaiming oil from vaporizer cartridges and filling vaporizer cartridges.

BACKGROUND

In recent years, vaporizers, also known as electronic cigarettes, e-cigarettes, or vapes, have gained tremendous popularity in the smoking community. Vaporizers are electronic devices that atomize or vaporize a substance so that it can be inhaled, similar to smoking. The substance is typically a liquid such as oil but can also be a dry substance. The oils often include flavored chemicals, nicotine, cannabis, and/or other compounds or extracts.

Figure 1:
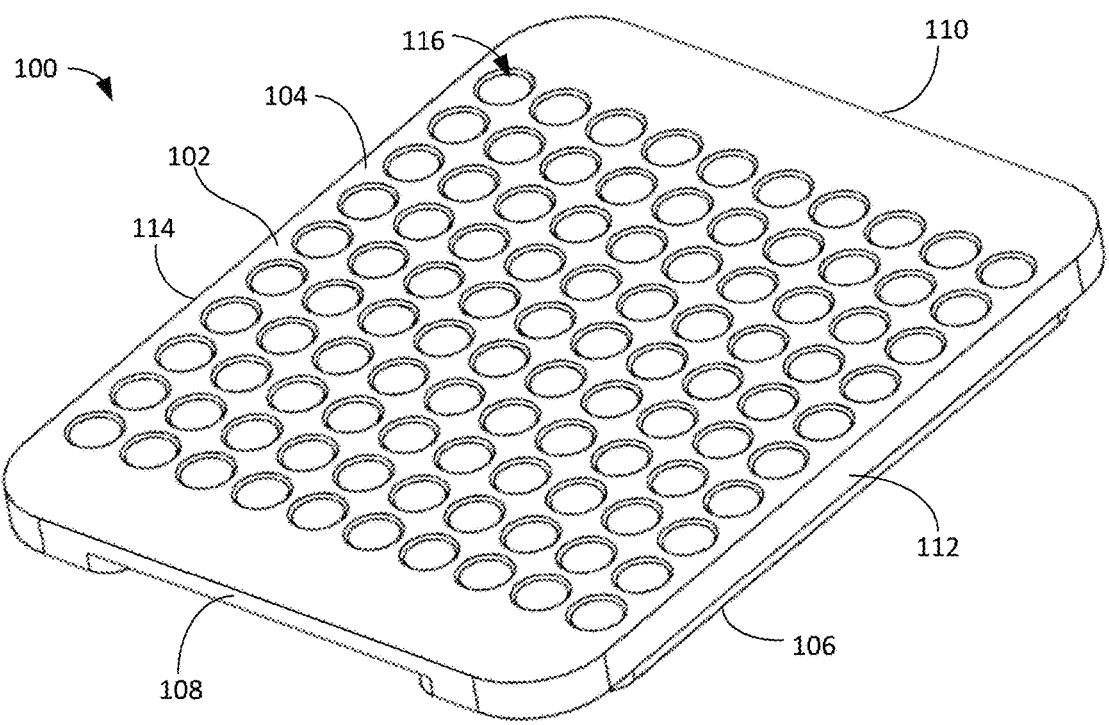
FIG. 1 is a top perspective view of an example plate of an example apparatus for vaporizer cartridge oil reclamation and filling as constructed in accordance with the teachings of this disclosure.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Disclosed herein are example methods and apparatus for reclaiming oil from vaporizer cartridges and/or for filling vaporizer cartridges with oil. A vaporizer cartridge is a container or receptacle that contains a substance, such as oil, that is to be atomized or vaporized. The cartridge can be connected to a vaporizer, such as a vape pen, which powers an atomizer in the cartridge to produce vapor that can be inhaled and enjoyed. The term "oil" is used herein to refer to the liquid substance in a vaporizer cartridge that is to be vaporized and inhaled. The term "oil" is not used to define any viscosity, solubility, and/or other properties of the substance. Thus, the term "oil" does not limit the liquid in the cartridge to a certain property. The terms "oil" and "liquid" can be used interchangeably herein.

There are many reasons a cartridge manufacturer and/or a vaporizer user may desire to reclaim oil from a vaporizer cartridge. For example, after a cartridge is used a certain number of times, the cartridge becomes depleted or low and the vaporizer stops producing vapor. Typically, a user discards the cartridge (e.g., throws it away) and attaches a new cartridge to the vaporizer. However, there is often a small or residual amount of oil that remains at the bottom or other areas of the cartridge. Over time, these small amounts of oil add up to a huge expense of wasted oil. Therefore, the example methods and apparatus disclosed herein can save manufacturers and/or users significant costs by enabling them to reclaim the oil and use the reclaimed oil rather than discarding the residual oil with the container. Thus, the example methods and apparatus also reduce waste.

As another example, a cartridge manufacturer and/or seller may realize there is a deficiency with a batch of cartridges, such as leaking cartridges. Rather than discarding the oil in the cartridges, the manufacturer and/or seller can utilize the example methods and apparatus disclosed herein to reclaim the oil from the cartridges. The oil can then be used to fill new cartridges. As another example, there may be a failure of the oil itself. For example, the oil may have too high of a concentration of a chemical that causes crystallization. A manufacturer and/or user can use the example methods and apparatus disclosed herein to reclaim the oil, such that the reclaimed oil can be altered and used to fill the same or another cartridge. Thus, there are many applications in which a manufacturer and/or user may desire to reclaim the oil from a vaporizer cartridge.

An example apparatus disclosed herein includes a plate having a plurality of openings extending through the plate. In some examples, the plate is constructed of a thermally conductive material, such as, for example, aluminum. The openings are sized and shaped to receive vaporizer cartridges. In some examples, the openings are sized and shaped to receive a certain standard sized cartridge, such as, for example, a cylindrical cartridge having 510 threads, commonly referred to as a 510 cartridge. One or more cartridges can be inserted into the openings in a first orientation such as in an upside-down or inverted orientation. In some examples, the plate has a shoulder in one, more than one, or each of the openings that supports the cartridge in the opening and prevents the cartridge from falling through the plate. In some examples, the apparatus also includes an open-top container, such as, for example, a tray. The plate can be set on top of the container. Then, the plate (along with the cartridge(s)) and the container can be inserted into an oven or other heating device. The oil in the cartridge(s) is heated and drains from the cartridge(s), through the openings in the plate, and into the container. After a period of time, the plate (along with the cartridge(s)) and the container can be removed from the oven. The plate is separated from the container. Then, the oil in the container can be collected and re-used. For example, a person can use a syringe to collect the oil from the container. The oil can then be injected into one or more cartridges (e.g., the same cartridges or different cartridges).

Additionally or alternatively, the example apparatus disclosed herein can be used for holding and/or warming vaporizer cartridges during filling operations. For example, one or more empty cartridges (or cartridge(s) having room to be filled) can be inserted into the openings of the example plate in a second orientation such as a right-side-up or unturned orientation. The plate with the cartridge(s) can be inserted into an oven and heated. This heats the cartridge(s) and the plate. The plate with the cartridge(s) is then removed. Then, a person and/or machine can inject oil into the cartridge(s) while the cartridges are supported in the openings in the plate. The increased temperature of the cartridge(s) helps the oil settle evenly in the cartridge(s) and helps reduce or prevent air bubbles in the oil. Further, the plate, which can be constructed of metal, remains heated for a period of time, and thus, prolongs this heating effect. As such, the example methods and apparatus disclosed herein enhance the quality of the oil fill process.

Figure 2:
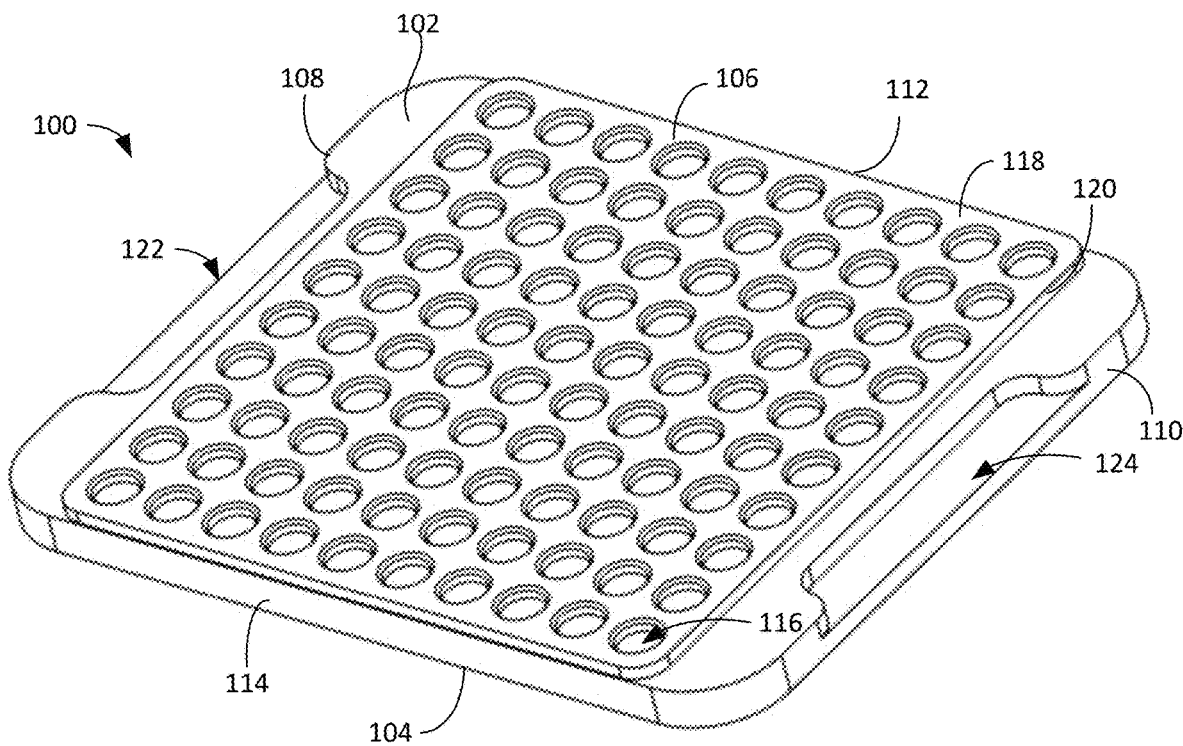
FIG. 2 is a bottom perspective view of the example plate of FIG. 1.

Now turning to the figures, FIGS. 1 and 2 illustrate an example vaporizer cartridge oil reclamation and filling apparatus 100 constructed in accordance with the teachings of this disclosure. The apparatus 100 includes an example plate 102. FIG. 1 is a perspective view of a top side of the example plate 102 and FIG. 2 is a perspective view of a bottom side of the example plate 102. The plate 102 can be used to hold one or more vaporizer cartridges during oil reclamation and/or filling processes, as disclosed in further detail herein.

In the illustrated example of FIGS. 1 and 2, the plate 102 has a first side 104, referred to herein as the top side 104, and a second side 106, referred to herein as the bottom side 106, opposite the top side 104. The plate 102 also has a first edge 108, a second edge 110 opposite the first edge 108, a third edge 112, and a fourth edge 114 opposite the third edge 112. In the illustrated example, the plate 102 is cuboid shape. However, in other examples, the plate 102 can have a different shape (an example of which is disclosed in conjunction with FIGS. 11-13).

In some examples, the plate 102 is constructed of a single unitary part or component (e.g., a monolithic structure). For example, the plate 102 can be constructed (e.g., machined, molded, etc.) from a piece of material, such as metal. In some examples, the plate 102 is constructed of a material that has relatively high thermal conductivity, which helps retain heat for warming the oil in the cartridges. For example, the plate 102 can be constructed of and/or otherwise include aluminum (e.g., 6061-T6 aluminum). Additionally or alternatively, the plate 102 can be constructed of other materials (e.g., glass, ceramic, steel, nickel, brass, etc.) and/or combination of materials.

To receive one or more vaporizer cartridges, the example plate 102 has a plurality of openings 116 (only one of which is referenced in FIGS. 1 and 2), which may also be referred to as drain openings. The openings 116 extend through the plate 102 between the top side 104 and the bottom side 106. In some examples, the openings 116 are formed by drilling holes through the plate 102 during manufacturing. In this example, each of the openings 116 is circular. In other examples, the openings 116 can be shaped differently (e.g., square, triangular, etc.). In this example, the plate 102 has 100 openings. In other examples, the plate 102 can have more or fewer openings 116. For example, the plate 102 can have one opening, two openings, three openings, etc.

As shown in FIG. 2, the bottom side 106 has an extended portion 118 defined by a wall 120. The extended portion 118 is raised or extended relative to the portions of the bottom side 106 near the first and second edges 108, 110. In some examples, the extended portion 118 is raised about 0.114 inches (e.g., +0.01 inches). The openings 116 extend through the extended portion 118. In some examples, when the plate 102 is set on an open-top container (e.g., a tray), the extended portion 118 extends into the container, and the wall 120 prevents the plate 102 from shifting or sliding off of the container.

In the illustrated example of FIG. 2, the plate 102 has a first recess 122 extending into the bottom side 106 along the first edge 108, and a second recess 124 extending into the bottom side 106 along the second edge 110. The first and second recesses 122, 124 form handle portions that can be used to receive a hand and/or finger(s) of a person and/or a part of an automated device (e.g., a robot) when lifting and/or otherwise transporting the plate 102. For example, when the plate 102 is setting on a surface with the bottom side 106 facing downward, the user can insert his/her fingers into the first and second recesses 122, 124 to grasp the first and second edges 108, 110 of the plate 102. Also, when setting the plate 102 onto a surface, the first and second recesses 122, 124 enable a person to remove their hands and/or finger(s) from under the plate 102 without dropping the plate 102. However, in other examples, the plate 102 may not have the extended portion 118 and/or the recesses 122, 124. Instead, the plate 102 may be substantially flat or planar on the bottom side 106.

Figure 3:
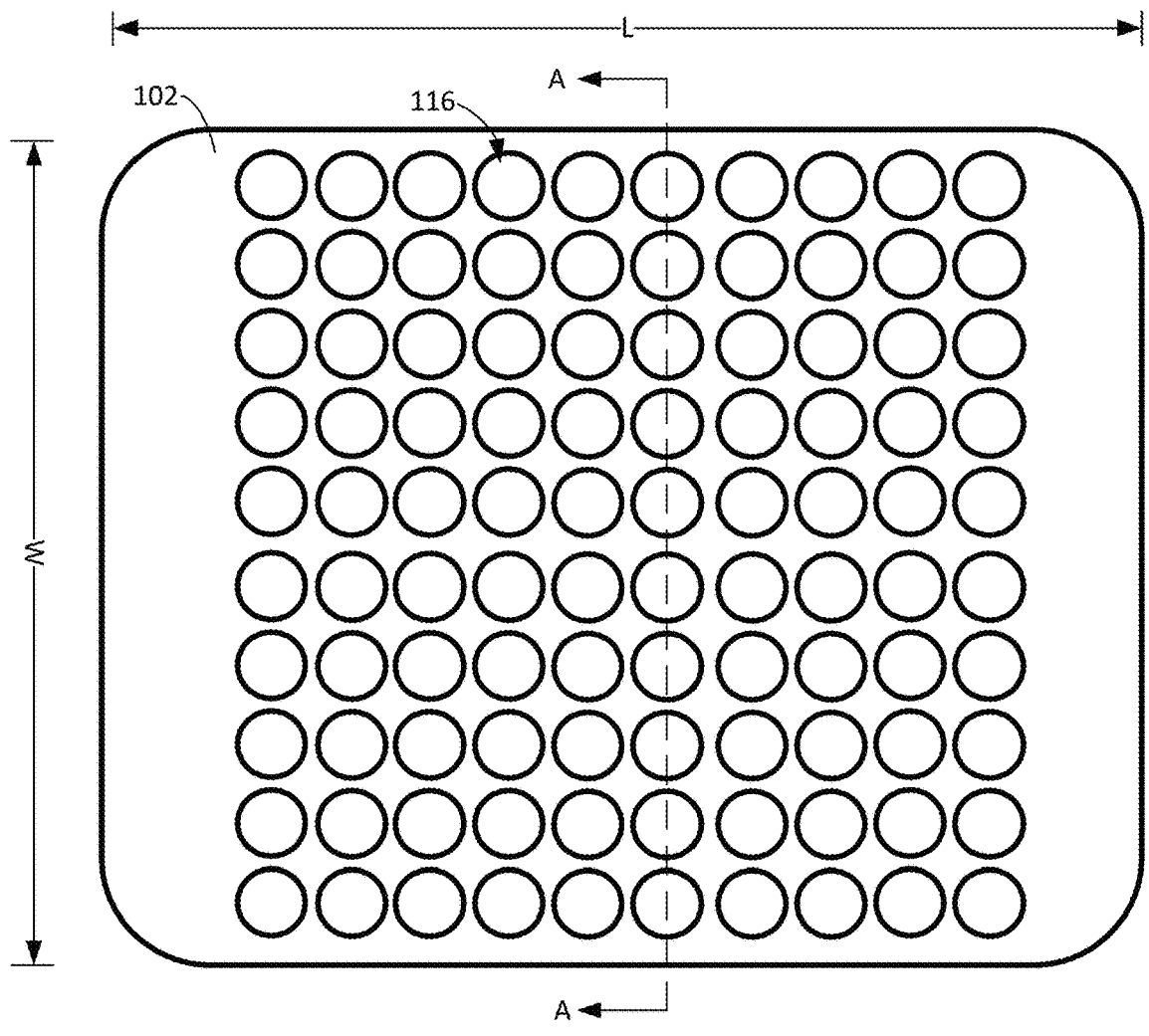
FIG. 3 is a top view of the example plate of FIG. 1.

FIG. 3 is a top view of the plate 102 showing the openings 116 (only one of which is referenced in FIG. 3). From the top view, the plate 102 is generally rectilinear shaped (e.g., rectangular) with rounded corners. The plate 102 has a length L and width W. The length L and width W can be any dimensions. In some examples, the length L is about 7.50 inches (e.g., ±0.01 inches) and the width is about 6.00 inches (e.g., ±0.01 inches). As shown in FIG. 3, the openings 116 are arranged in pattern. In this example, the openings 116 are arranged in a grid or matrix pattern of rows and columns (e.g., 10×10). In some examples, the openings 116 are spaced equidistant from each other. In some examples, the openings 116 are spaced apart (from center to center) by about 0.578 inches (e.g., ±0.005 inches). In some examples, this pattern and spacing maximizes the number of cartridges that can be accommodated on the plate 102. In other examples, the openings 116 can be arranged in other patterns and/or may be spaced differently. In some examples, all of the openings 116 are the same diameter and/or shape (e.g., circular). In other examples, one or more of the openings 116 may have a different diameter and/or shape. For example, the plate 102 may have larger diameter openings for larger cartridge sizes and smaller diameter openings for smaller cartridge sizes. In some examples, the plate 102 may include a combination of openings of different shapes and/or sizes.

Figure 4:
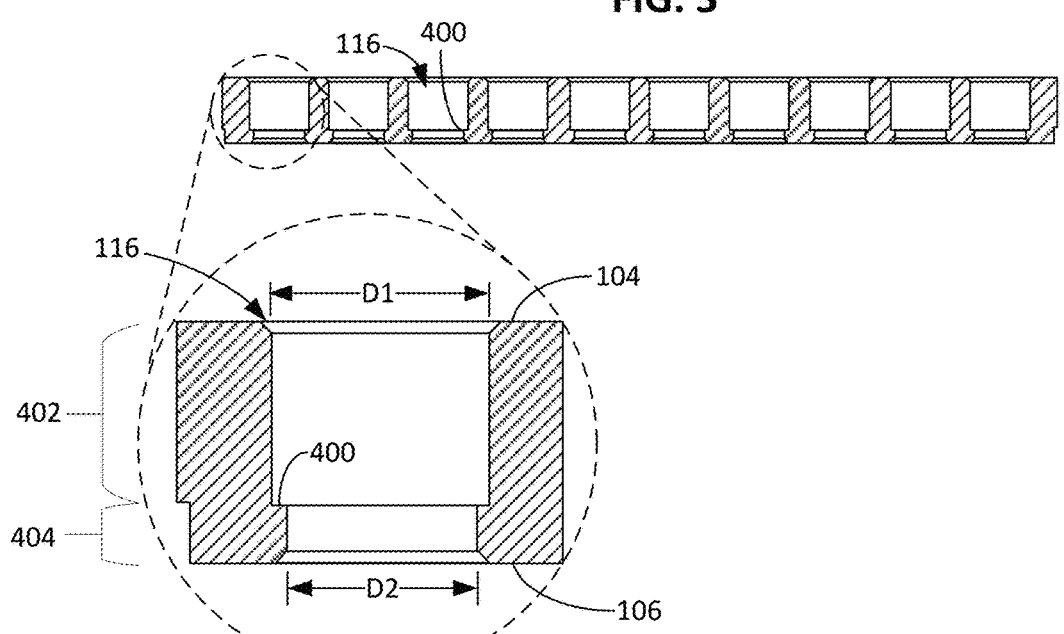
FIG. 4 is a cross-sectional view of the example plate taken along line A-A of FIG. 3.

FIG. 4 is a cross-sectional view of the example plate 102 taken along line A-A of FIG. 3. As shown, the plate 102 has a shoulder 400 (e.g., a ledge) formed in each of the openings 116 (only one of which is referenced in FIG. 4). When a cartridge is disposed in one of the openings 116, the cartridge rests on the shoulder 400, which prevents the cartridge from falling through the opening 116. FIG. 4 includes a callout of an enlarged view of one of the openings 116. Each of the other openings 116 is the same as the opening 116 in the callout, in this example. Therefore, any of the example aspects disclosed in connection with the opening 116 in the callout can likewise apply to the other openings 116. As shown in the callout in FIG. 4, the opening 116 has a first portion 402 with a first diameter D1 and a second portion 404 with a second diameter D2 that is less than the first diameter D1. The first portion 402 extends from the top side 104 to the shoulder 400, and the second portion 404 extends from the shoulder 400 to the bottom side 106. D1 can be any diameter sized to fit a desired cartridge. In this example, the first portion 402 is longer (in the vertical direction) than the second portion 404. In some examples, the first portion 402 is about 0.356 inches (e.g., ±0.005) and the second portion 404 is about 0.114 (e.g., ±0.005). In other examples, the second portion 404 can be longer (in the vertical direction) than the first portion 402 or the first portion 402 and the second portion 404 may be the same length. In some examples, the edge of the opening 116 at the top side 104 and the bottom side 106 is angled or tapered. This helps reduce sharp edges on the plate 102 that could potentially injure a person and/or damage a cartridge.

In some examples, the first portions 402 of each of the openings 116 are dimensioned to receive a certain type and size of cartridge, such as, for example, a standard 510 cartridge. In such an example, the first diameter D1 is larger than the outer diameter of a standard 510 cartridge, and the second diameter D2 is smaller than the outer diameter of a standard 510 cartridge. For example, D1 is about 0.425 inches (e.g., ±0.005), and D2 is about 0.395 (e.g., ±0.005). As such, a standard 510 cartridge can be inserted into the first portion 402 of the opening 116 and rest on the shoulder 400 without falling through the opening 116. Therefore, the first portion 402 of respective ones of the openings 116 are sized to receive a vaporizer cartridge such that the vaporizer cartridge can be inserted into the opening 116 in either an upside-down or right-side-up orientation.

Figure 5:
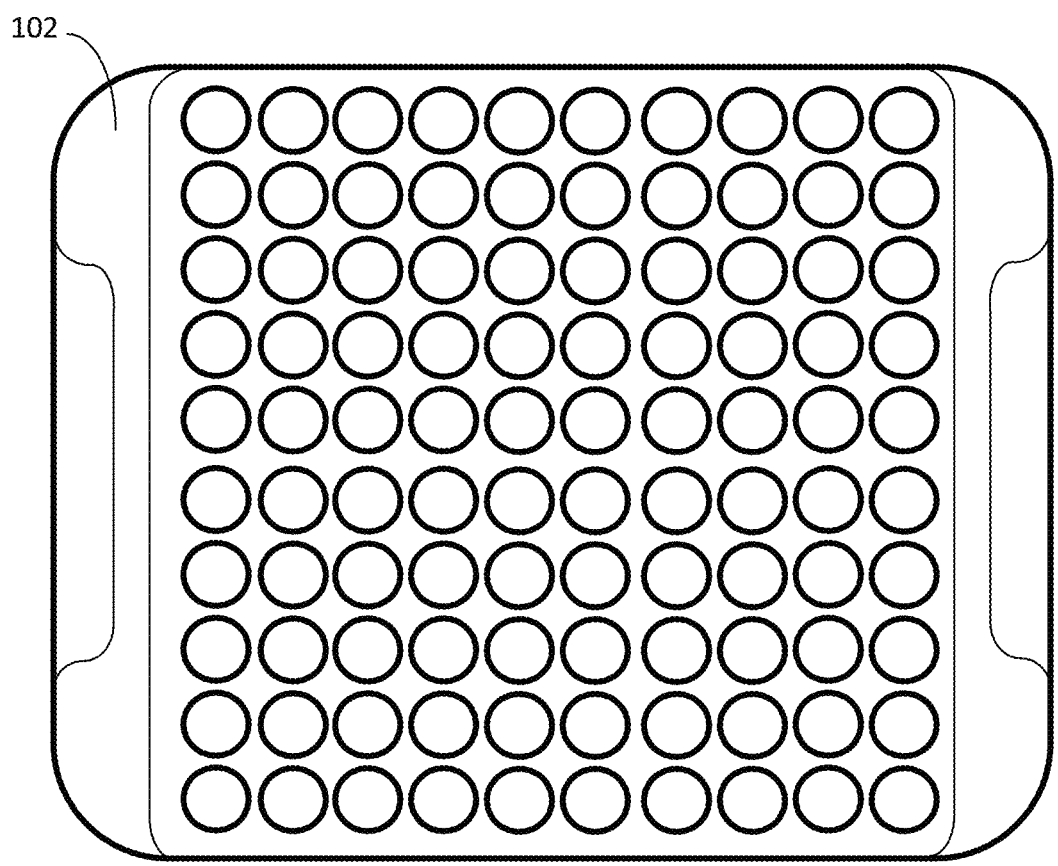
FIG. 5 is a bottom view of the example plate of FIG. 1.
Figure 6:
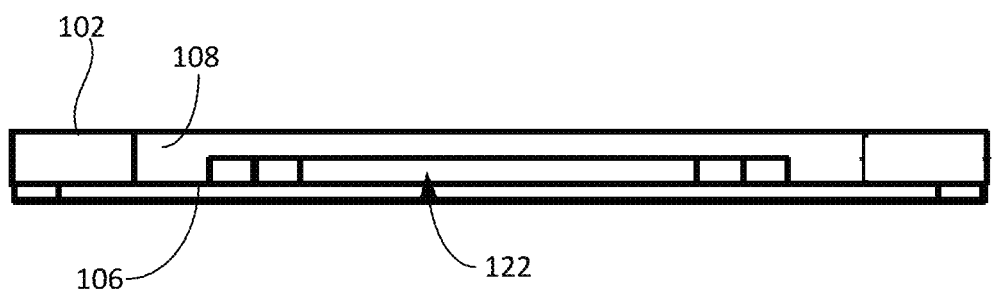
FIG. 6 is a side view of the example plate of FIG. 1.

FIG. 5 is a bottom view of the example plate 102. FIG. 6 is a side view of the example plate 102 showing the first edge 108 of the plate 102. As shown in FIG. 6, the first recess 122 extends into the bottom side 106 along the first edge 108.

In some examples, the apparatus 100 includes an open-top container to collect the oil drained from the cartridge(s). For example, in FIG. 7, the example apparatus 100 includes an example open-top container 700. The container 700 may be any type of container, such as for example, a pan or tray. The container 700 forms a collecting cavity 702. The container 700 has a top edge 704. The plate 102 can be set on the container 700. One or more cartridges can be inserted in an upside-down orientation into the openings 116 (only one of which is referenced in FIG. 7) so that the oil drains into the collecting cavity 702. The extended portion 118 is sized to be received in the container 700. As such, when the plate 102 is disposed on the container 700, the bottom side 106 near the first and second edges 108, 110 rests on the top edge 704, and the recessed portion 118 of the bottom side 106 extends into the cavity 702. This prevents the plate 102 from shifting or moving laterally on the container 700. The recesses 122, 124 (FIG. 2) enable a person and/or an automated machine to lift and lower the plate 102 relative to the container 700.

Figure 8:
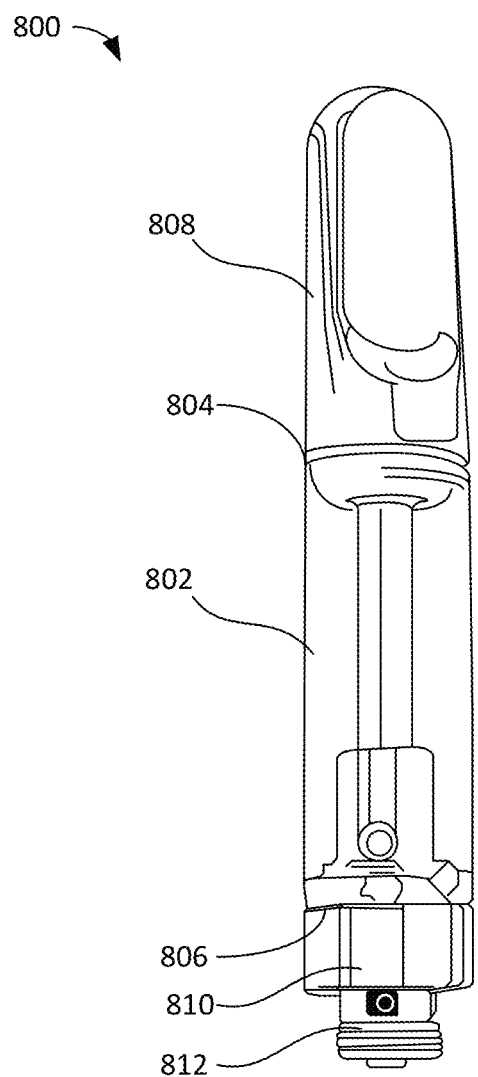
FIG. 8 is a perspective view of an example vaporizer cartridge.

FIG. 8 shows an example vaporizer cartridge 800. The vaporizer cartridge 800 in this illustrated example is a standard 510 cartridge, which is a cartridge having 510-sized threads. Standard 510 cartridges typically have a cylindrical body with a standard diameter. However, standard 510 cartridges come in various lengths. In the illustrated example, the cartridge 800 has a cylindrical reservoir casing 802. In some examples, the casing 802 is constructed of glass or plastic. The reservoir casing 802 can be filled with oil (or another substance). The reservoir casing 802 has a top end 804 and a bottom end 806 opposite the top end 804. The cartridge 800 has a mouthpiece 808 coupled to the top end 804. The cartridge 800 has an atomizer 810 in the bottom end 806. A threaded extension 812 extends from the bottom side of the atomizer 810. In this example, the threaded extension 812 has 510-sized threads. The threaded extension 812 can be screwed into a vaporizer (e.g., a vape pen) or other operating device. The atomizer 810 extends into the reservoir casing 802. When the cartridge 800 is screwed into a vaporizer, the vaporizer (e.g., via a battery or other power source) activates the atomizer 810, which atomizes the oil into vapor. The vaporized oil can be inhaled through the mouthpiece 808.

FIGS. 9A-9E illustrate an example process of reclaiming oil from one or more vaporizer cartridges using the example apparatus 100. The example process is disclosed in connection with the cartridge 800. However, it is understood that the example process can be performed with multiples ones of the cartridge 800 and/or other types of cartridges (e.g., other sizes, shapes, etc.) simultaneously. The process can be performed manually by a person and/or with automated machinery.

Figure 7:
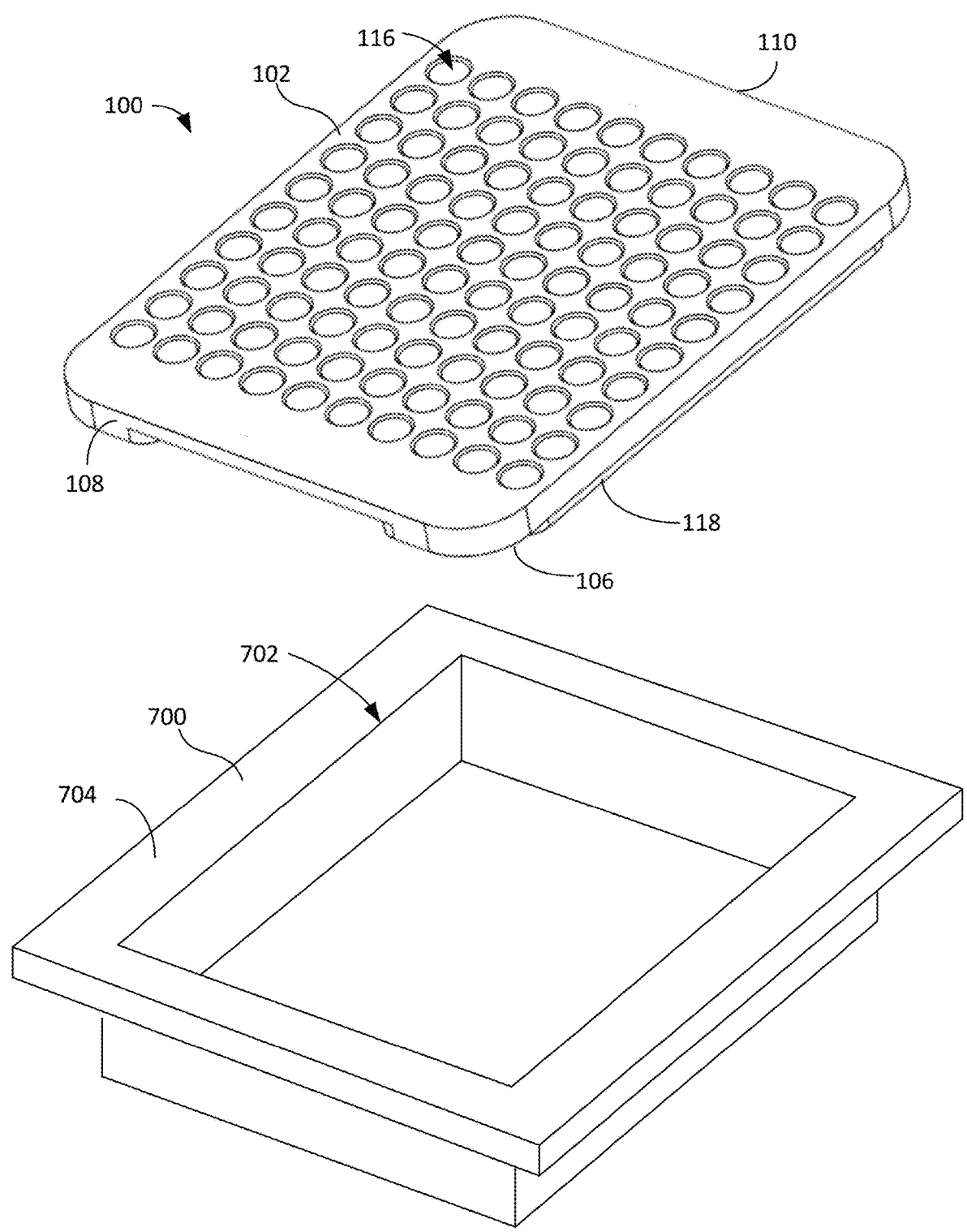
FIG. 7 illustrates an example open-top container of the example apparatus of FIG. 1 that can be used with the example plate for oil reclamation.
Figure 9A:
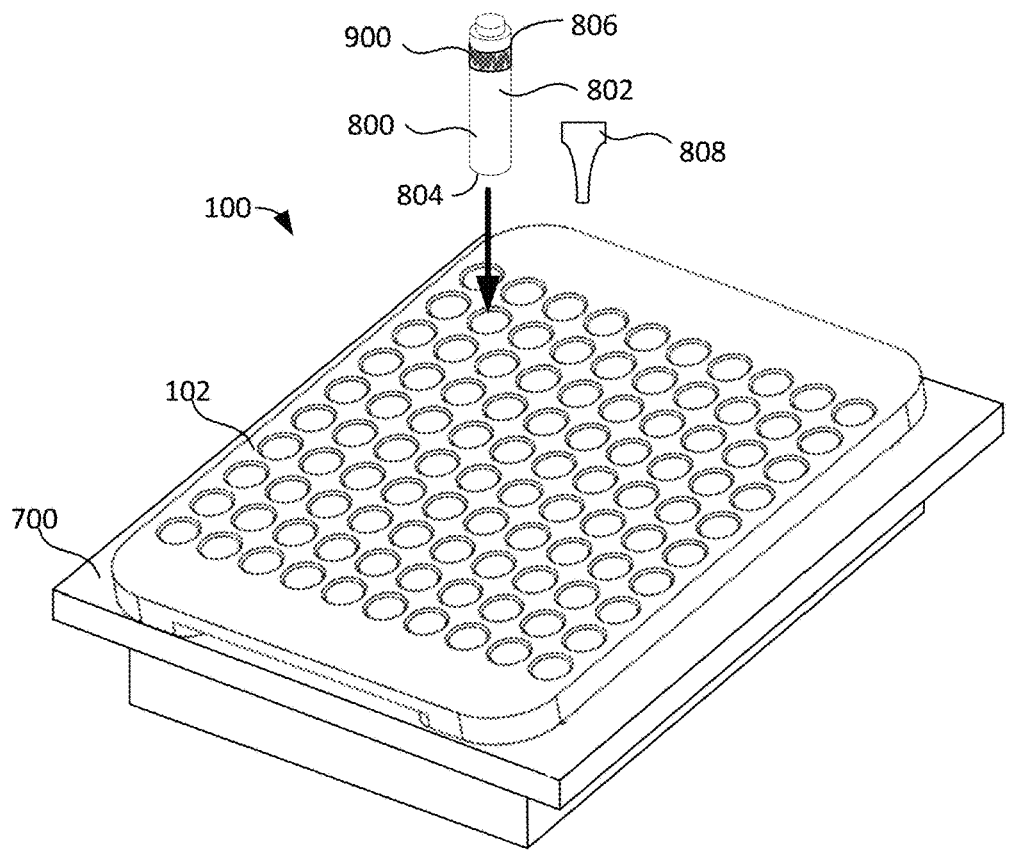
FIGS. 9A-9E illustrate steps of an example oil reclamation process using the example apparatus of FIG. 1.
Figure 9B:
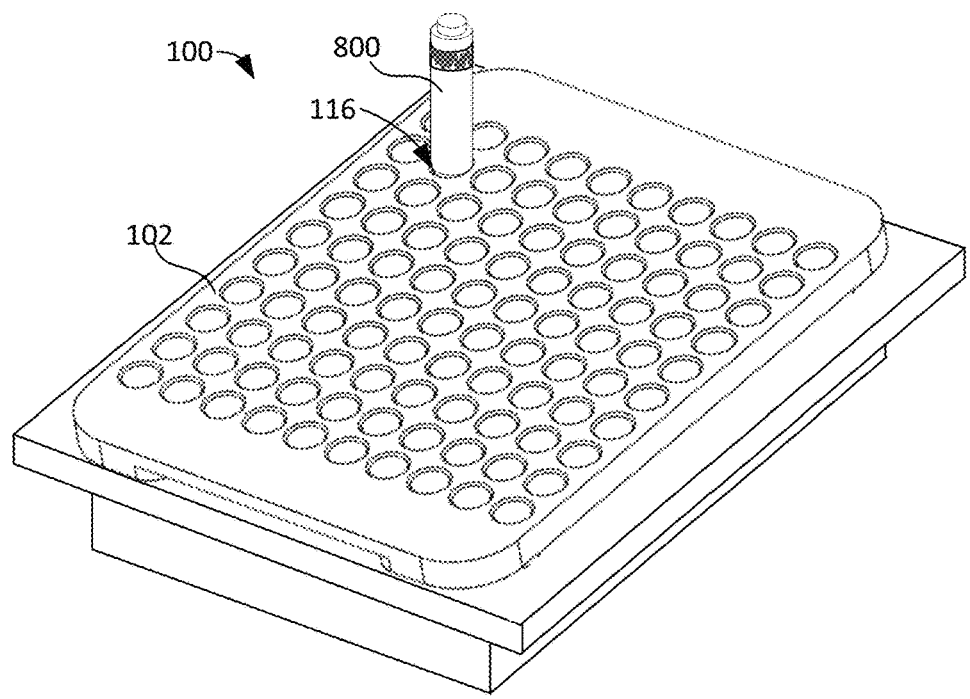

As shown in FIG. 9A, the plate 102 is placed on top of the container 700. For example, a person can set the plate 102 onto the container 700, such that the extended portion 118 (FIG. 7) is inserted into the cavity 702 (FIG. 7). It is assumed a small amount of oil 900 remains in the cartridge 800. In most instances (because the cartridge 800 is stored vertically), the oil 900 collects near the bottom end 806 of the casing. The mouthpiece 808 is removed from the reservoir casing 802. Then, as shown in FIG. 9B, the cartridge 500 is inserted in an upside-down orientation into one of the openings 116 in the plate 102 (with the top end 804 of the reservoir casing 802 facing downward).

Figure 9C:
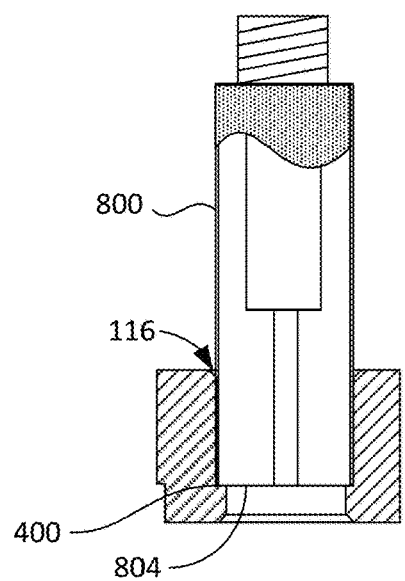
Figure 9D:
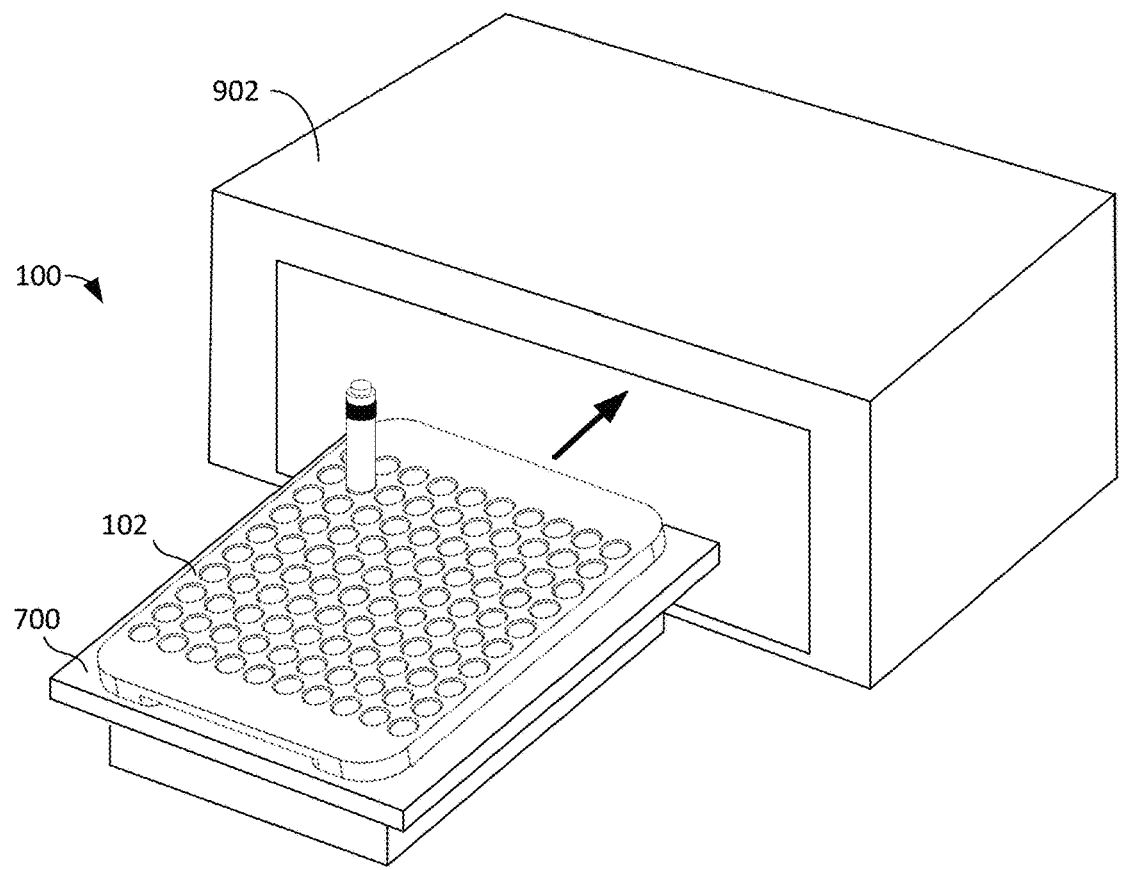
Figure 9E:
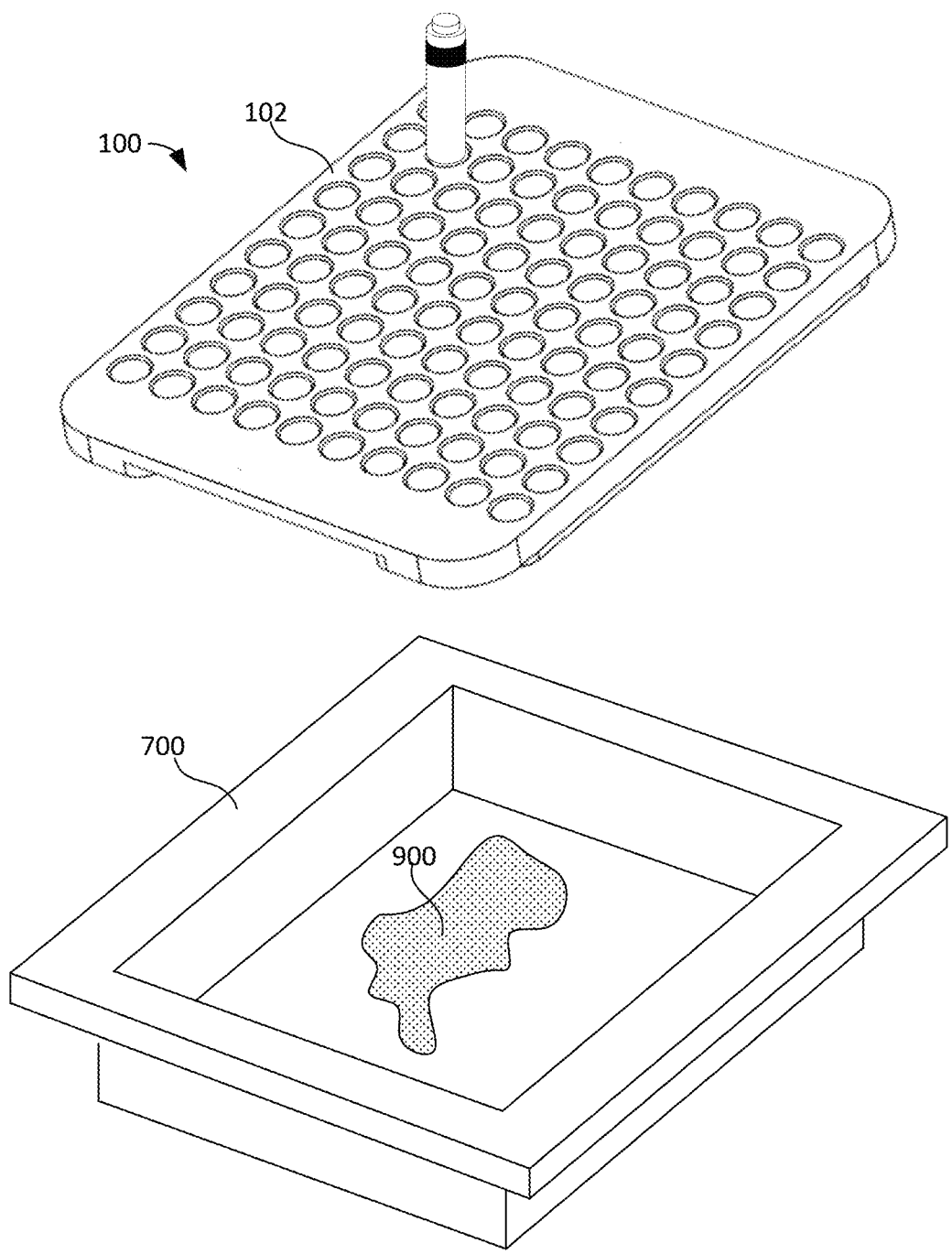

FIG. 9C is a cross-sectional view of the cartridge 800 in the opening 116. As shown in FIG. 9C, the top end 804 of the reservoir casing 802 of the cartridge 500 engages the shoulder 400, which supports the cartridge 800 and prevents the cartridge 800 from falling through the plate 102. Multiple cartridges may be similarly inserted into the other openings 116. In FIG. 9D, the plate 102 (with the cartridge 800 and/or other cartridge(s)) and the container 700 are inserted into an oven 902. The oven heats the oil 900 in the cartridge 800. The plate 102, which may be constructed of thermally conductive material, also warms and helps transfer heat to the cartridge 800 and, thus, to the oil. As the oil 900 warms, the oil 900 becomes less viscous and drains from the reservoir casing 802 and through the opening 116 into the container 700. The apparatus 100 may be allowed to warm in the oven 902 for a period of time at a certain temperature to ensure all or most of the oil 900 is drained from the cartridge 800. After a period of time, the plate 102 (with the cartridge 800) and the container 700 are removed from the oven. Then, as shown in FIG. 9E, the plate 102 can be separated or removed from the container 700. As shown FIG. 9E, the oil 900 has collected in the container 700. A user can then collect the oil 900 (e.g., using a syringe) and transfer the oil to another cartridge for consumption. While in this example the oven 902 is used to heat the oil, in other examples, other devices can be used to heat the oil. For example, a heating element (e.g., a heat coil) can be attached to the plate 102 to warm the plate 102 and the cartridge(s).

Figure 10A:
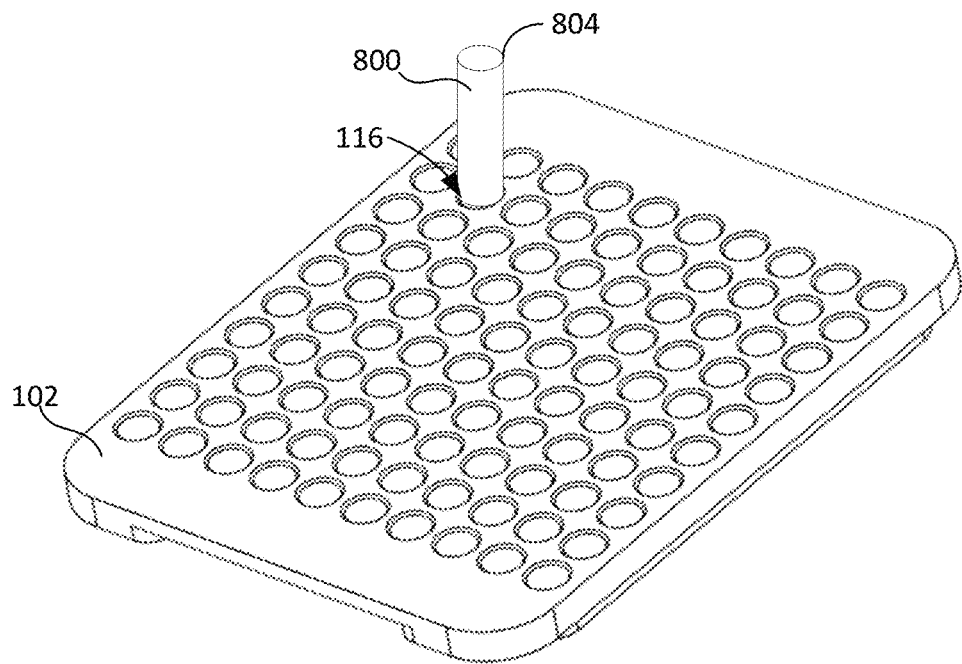
FIGS. 10A and 10B illustrate steps of an example vaporizer cartridge filling process using the example apparatus of FIG. 1.
Figure 10B:
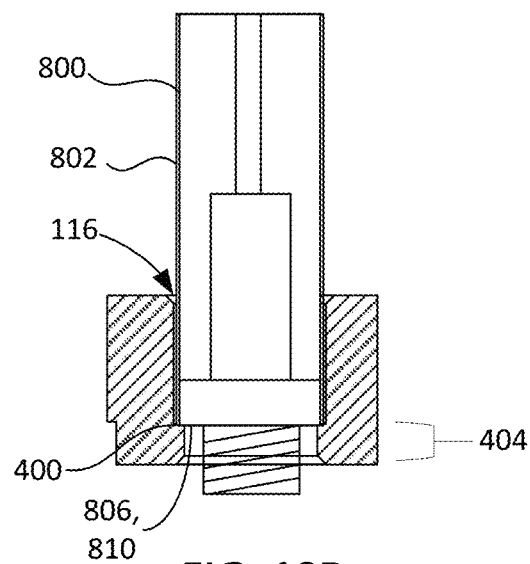

The example apparatus 100 can also be used when filling one or more cartridges. In particular, the plate 102 can be used to hold one or more cartridges when filling the cartridges with oil. For example, as shown in FIG. 10A, the cartridge 800 can inserted into one of the openings 116 with the top end 804 facing upward. In this example, it is assumed the cartridge 800 is empty. FIG. 10B is a cross-sectional view of the cartridge 800 in the opening 116. As shown in FIG. 10B, the bottom end 806 of the reservoir casing 802 and/or the atomizer 810 engages the shoulder 400, which prevents the cartridge 800 from falling through the plate 102. The threaded extension 812 extends into the second portion 404 of the opening 116. Multiple cartridges may be similarly inserted into the other openings 116.

In some examples, prior to filling the cartridge 800, the plate 102 with the cartridge 800 (and/or one or more other cartridges) can be inserted into an oven (e.g., the oven 902) and heated. This heats up the cartridge 800 and the plate 102. The plate with the cartridge 800 can be removed from the oven. Then, a person can fill the cartridge 800 with oil. In some examples, a person uses a syringe or other device to add oil to the cartridge 800. The heated cartridge 800 helps keep the oil warm to help the oil settle evenly in the cartridge 800 and reduces air bubbles in the oil. Further, the plate 102 retains heat, which helps keeps the cartridge 800 warmer for a longer period of time.

Figure 11:
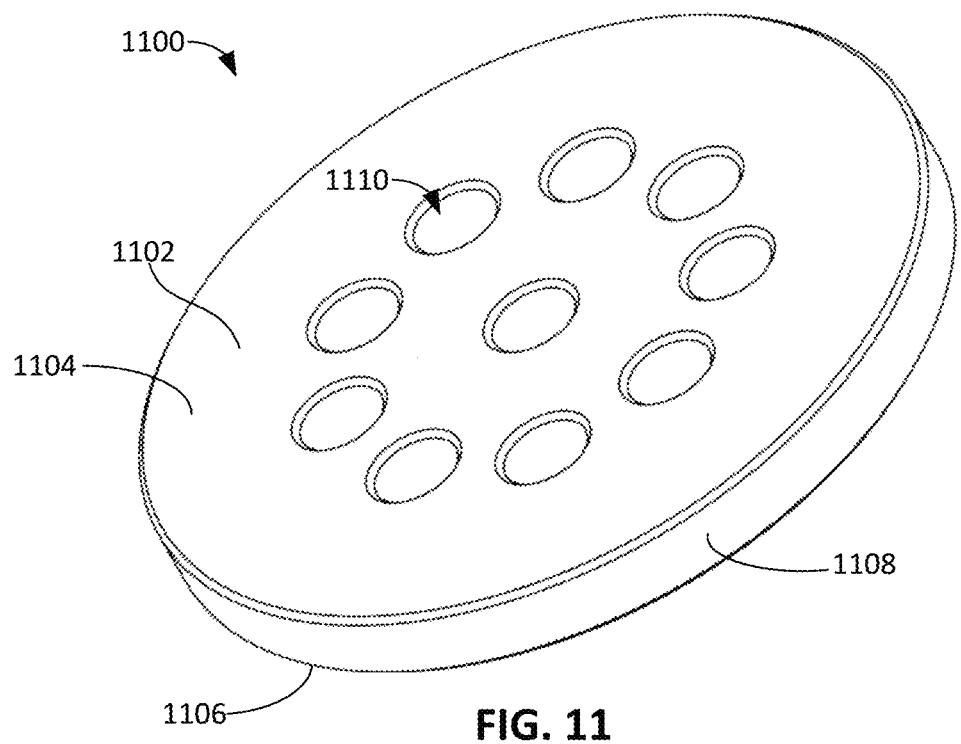
FIG. 11 is a top perspective view of another example plate of an example apparatus for vaporizer cartridge oil reclamation and filling as constructed in accordance with the teachings of this disclosure.
Figure 12:
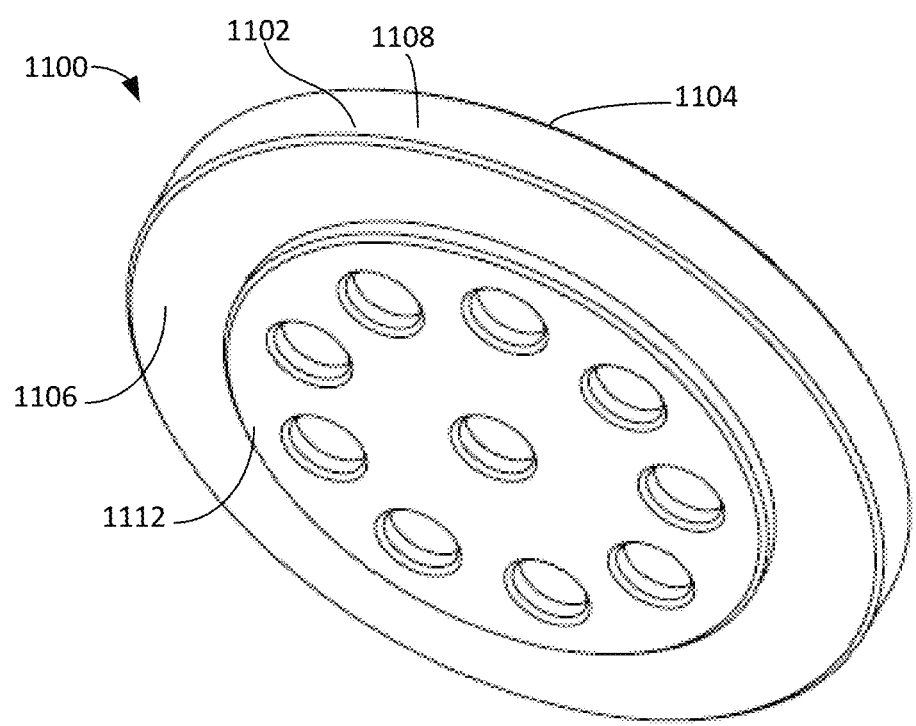
FIG. 12 is a bottom perspective view of the example plate of FIG. 11.

While in FIGS. 1-10B the plate 102 is cuboid shaped, in other examples, the plate 102 can be shaped differently. For example, FIGS. 11 and 12 illustrate another example apparatus 1100 with an example plate 1102. The example plate 1102 is substantially the same as the plate 102 disclosed herein. Therefore, any of the example aspects disclosed in connection with the plate 102 can likewise apply to the plate 1102. However, in this example, the plate 1102 is disc shaped. As shown in FIGS. 11 and 12, the plate 1102 has a top side 1104, a bottom side 1106 opposite the top side 1104, and an outer peripheral edge 1108 between the top and bottom sides 1104, 1106. The plate 1102 has a plurality of openings 1110 (which may also be referred to as drain openings). extending through the plate 1102 between the top and bottom sides 1104, 1106. The openings 1110 can be sized and shape to receive standard 510 cartridges. The openings 1110 can have shoulders like the shoulder 400 disclosed in connection with the openings 116 of the plate 102. In this example, the plate 1102 has less openings than the plate 102 disclosed above. As such, the example plate 1102 may be used for smaller batches. However, in other examples, the plate 1102 can have more or fewer openings. In the illustrated example, the openings 1110 are arranged in a circular pattern around a center of the plate 1102, and one of the openings 1110 extends through the center of the plate 1102. In other examples, the openings 1110 can be arranged in other patterns.

Figure 13:
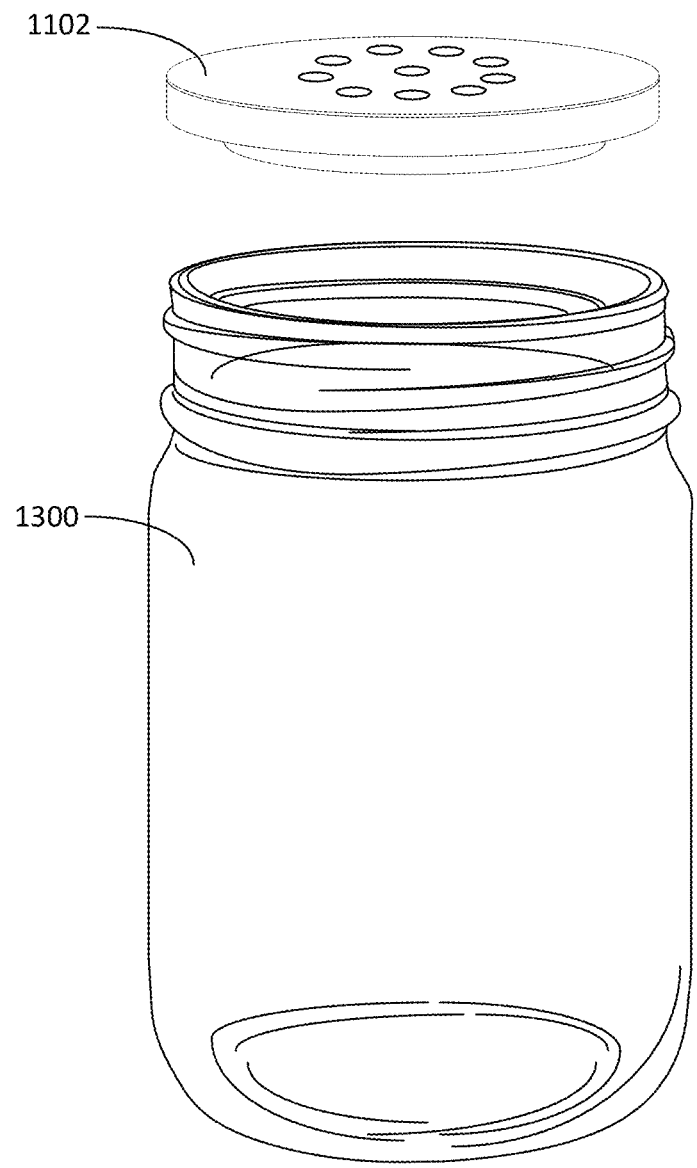
FIG. 13 illustrates an example open-top container of the example apparatus of FIG. 11 that can be used with the example plate for oil reclamation.

As shown in FIG. 12, the bottom side 1106 has an extended portion 1112. The extended portion 1112 can be used to help retain the plate 1102 on an open-top container. For example, as shown in FIG. 13, the apparatus 1100 includes an open-top container 1300. In this example, the container 1300 is a glass jar. For example, the container 1300 can be the glass mason jar. The extended portion 1112 is sized to be inserted into the mouth of the jar. In other examples, the container 1300 can be implemented by another type of container, such as a circular metal tray (e.g., an aluminum tray). The container 1300 can be used to collect oil from one or more cartridges during a reclamation process, as disclosed in connection with FIGS. 9A-9E.

Figure 14:
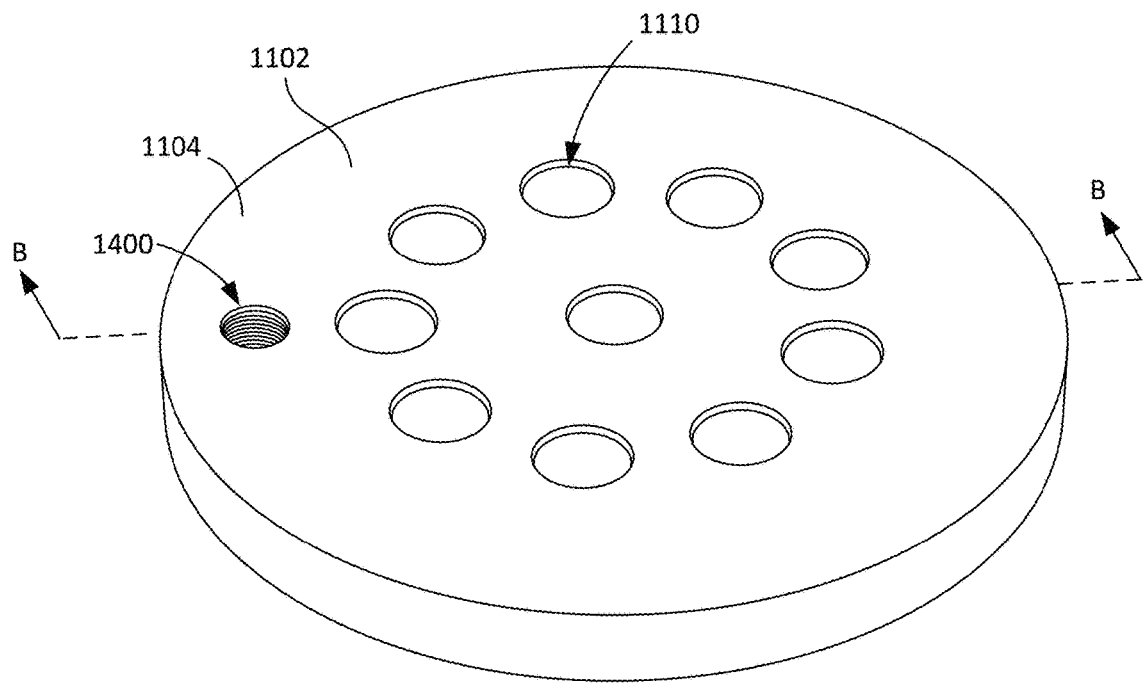
FIG. 14 is a perspective view of the example plate of FIG. 11 in which the example plate has an example threaded opening.

In some examples, the apparatus 100, 1100 can include one or more feature(s) to assist in removing a mouthpiece of a vaporizer cartridge. In particular, the mouthpiece of a vaporizer cartridge is often friction fit very tightly onto the reservoir casing and/or atomizer tube and cannot be easily separated from the reservoir casing by hand. The additional feature(s) can be used to help a user remove the mouthpiece so the user can insert the reservoir casing upside-down into the plate 102, 1102 for oil reclamation. For example, FIG. 14 illustrates an example in which the plate 1102 has a threaded opening 1400 (e.g., a threaded bore, a threaded through-hole) extending into the top side 1104 of the plate 1102. The threaded opening 1400 is sized receive the threaded portion (e.g., the threaded extension 812 (FIG. 8)) on a vaporizer cartridge. As such, the vaporizer cartridge can be screwed into the opening 1400 to securely hold the vaporizer cartridge while a user removes (e.g., via prying) the mouthpiece from the reservoir casing. In the illustrated example of FIG. 14, the openings 1110 (one of which is reference in FIG. 14) are arranged in a circular pattern around a center of the plate 1102, and the threaded opening 1400 is disposed outside of the circular pattern. However, in other examples, the threaded opening 1400 can be disposed in another location or arrangement relative to the openings 1110.

Figure 15:
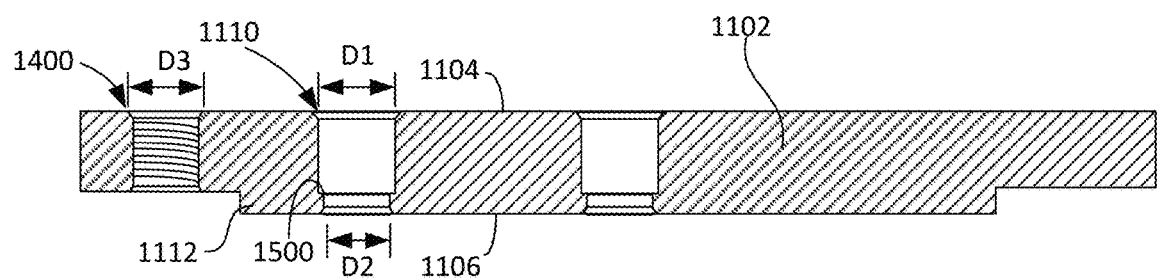
FIG. 15 is a cross-sectional view of the example plate of FIG. 14 taken along line B-B.

FIG. 15 is a cross-sectional view of the plate 1102 taken along line B-B of FIG. 15. In the illustrated example, the threaded opening 1400 extends through the plate 1102 between the top side 1104 and the bottom side 1106. In other examples, the threaded opening 1400 may extend only partially into the top side 1104 and not completely through the plate 1102. The threaded opening 1400 is sized and threaded (e.g., has the same or complementary thread pattern) to receive the threaded portion of a 510-thread vaporizer cartridge. The openings 1110 (drain openings) are non-threaded. As disclosed herein, the upper portions of the openings 1110 have a diameter of D1, which is sized to receive a vaporizer cartridge and, more specifically, the reservoir casing of a vaporizer cartridge. Each of the openings 1110 has a shoulder 1500. In the illustrated example, the threaded opening 1400 has a diameter D3, which is less than the diameter D1 of the upper portions of the openings 1110. In the illustrated example, the openings 1110 extend through the extended portion 1112 on the bottom side 1106, but the threaded opening 1400 is disposed outside (i.e., does not extend through) the extended portion 1112. However, in other examples, the threaded opening 1400 may also extend through the extended portion 1112.

Figure 16:
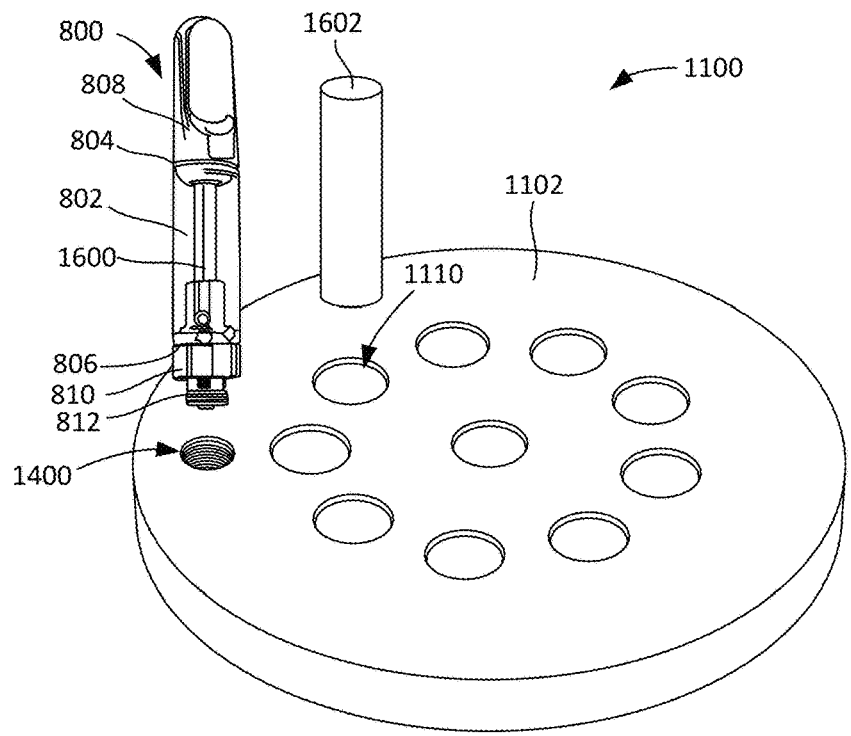
FIG. 16 shows the example plate of FIG. 14, an example cylindrical post, and example vaporizer cartridge.

FIG. 16 shows the plate 1102 and the example vaporizer cartridge 800. The mouthpiece 808 is coupled to the top end 804 of the reservoir casing 802, which holds oil or other fluid. In some examples, the mouthpiece 808 is friction fit tightly to the reservoir casing 802 and/or an atomizing tube 1600. The atomizer 810 is coupled to the bottom end 806 of the reservoir casing 802 and has the threaded extension 812. In FIG. 16, the apparatus 1100 includes an example cylindrical post 1602. In some examples, the post 1602 is constructed of metal, such as aluminum. The post 1602 has a diameter that is less than the diameter D1 (FIG. 15) of the upper portion of the openings 1110 such that the post 1602 can be removably inserted into one of the openings 1110 and used as a leverage support for a tool when removing the mouthpiece 808 of the vaporizer cartridge 800. In some examples, the diameter of the post 1602 is larger than the diameter D2 (FIG. 15) of the lower portions so that when inserted into one of the openings 1110, the post 1602 sits on the shoulder 1500 (FIG. 15) without falling or extending through the opening 1110. In other examples, the diameter of the post 1602 may be smaller than D2. While in this example the post 1602 is cylindrical, in other examples the post 1602 can be shaped differently (e.g., cuboid-shaped).

Figure 17:
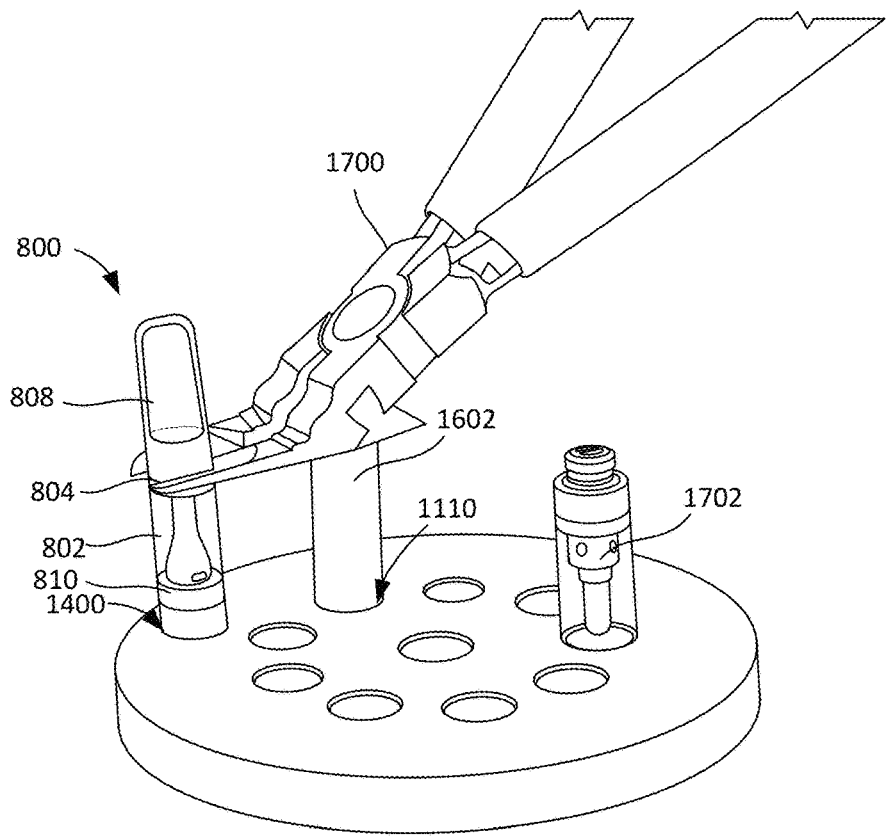
FIG. 17 shows the example plate of FIG. 16 with the example vaporizer cartridge screwed into the example threaded opening and the example post inserted into another opening and used as a support for a pair of pliers to remove a mouthpiece of the example vaporizer cartridge.

As shown in FIG. 17, a user can screw the vaporizer cartridge 800 into the threaded opening 1400. Further, the user can insert the post 1602 into one of the openings 1100. Then, as shown in FIG. 17, a user can place a tool such as, for example, a pair of pliers 1700, on a top of the post 1602 and pinch the mouthpiece 808. The user can press down on the handles of the pliers 1700 to pry the mouthpiece 808 upward and off of the reservoir casing 802. The threaded opening 1400 securely holds the reservoir casing 802 and the atomizer 810 while the mouthpiece 808 is removed from the reservoir casing 802. The post 1602 provides a leverage or fulcrum point at or around the same height as the mouthpiece 808 to enable a user to apply lever to remove the mouthpiece 808. In other examples, other types of tools can be used. After the mouthpiece 808 is removed from the top end 804 of the reservoir casing 802, the vaporizer cartridge 800 can be unscrewed from the threaded opening 1400, and then the vaporizer cartridge 800 (specifically, the reservoir casing 802) can be inserted upside down into one of the openings 1110 to drain the oil from the reservoir casing 802. For example, FIG. 17 shows another example vaporizer cartridge 1702 inserted into one of the openings 1110 in an upside-down orientation. A user can repeat this process multiple times for moving the mouthpieces from the vaporizer cartridges and inserting the cartridges into the plate 1102. The user can remove the post 1602 from the plate 1102 after removing the mouthpiece(s).

In some examples, the post 1602 is releasably coupled to the plate 1102. For example, the post 1602 can be inserted into one of the openings 1110. In some examples, the post 1600 and the opening 1110 form a clearance fit, such that the fit is relatively loose. In other examples, the post 1602 and the opening 1110 may form a tighter fit, such as a transition fit or an interference fit to more tightly hold the post 1602 in the opening 1110. In other examples, the apparatus 1100 may include one or more other features to hold the post 1602, such as a clamping mechanism on the plate 1102. In other examples, the post 1602 may be permanently fixed to the plate 1102. For example, the post 1602 may be welded onto the plate 1102.

Figure 18:
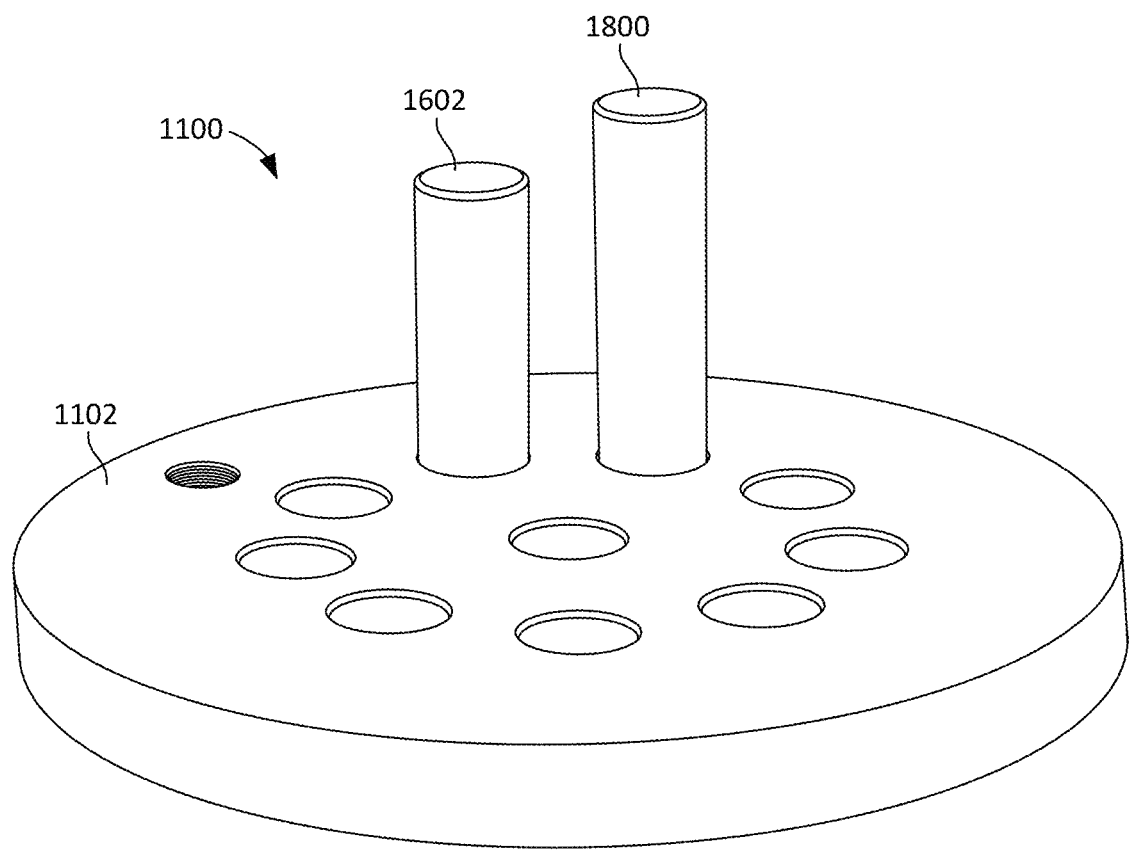
FIG. 18 shows the example plate of FIG. 16 with an additional post that is a different length.

In some examples, the apparatus 1100 can include multiple posts of different lengths for use with vaporizer cartridges of different lengths. For example, FIG. 18 shows an example in which the apparatus 1100 includes a second post 1800 that is longer than the post 1602. The longer post 1800 can be used for cartridges that are longer because the mouthpiece may be higher when the vaporizer cartridge is screwed into the plate 1102. In some examples, the apparatus 1100 can include additional posts of different lengths. In some examples, the apparatus 1100, including the plate 1102, the post(s) 1602, 1800, and/or the pliers 1700, can be sold and/or otherwise provided as part of a kit or assembly.

As can be appreciated, the example plate 1102 includes means for coupling or fastening a vaporizer cartridge to the plate 1102 while the mouthpiece is removed. In some examples, the means for coupling or fastening is implemented as the threaded opening 1400. In other examples, the plate 1102 can include other types of features or structures for coupling or fastening a vaporizer cartridge to the plate 1102. For example, the plate 1102 can include an opening and a ball-lock pin that interfaces with a feature (e.g., a hole) on the vaporizer cartridge to secure the vaporizer cartridge to the plate. In other example, the plate 1102 can include a clamp that securely holds the vaporizer cartridge on the plate 1102.

While the example threaded opening 1400, the example post 1602, and the example pliers 1700 are described in connection with the disc shaped plate 1102, it is understood that any of these example aspects and processes can similarly be implemented in connection with the cuboid-shaped plate 102 of FIG. 1.

Figure 19:
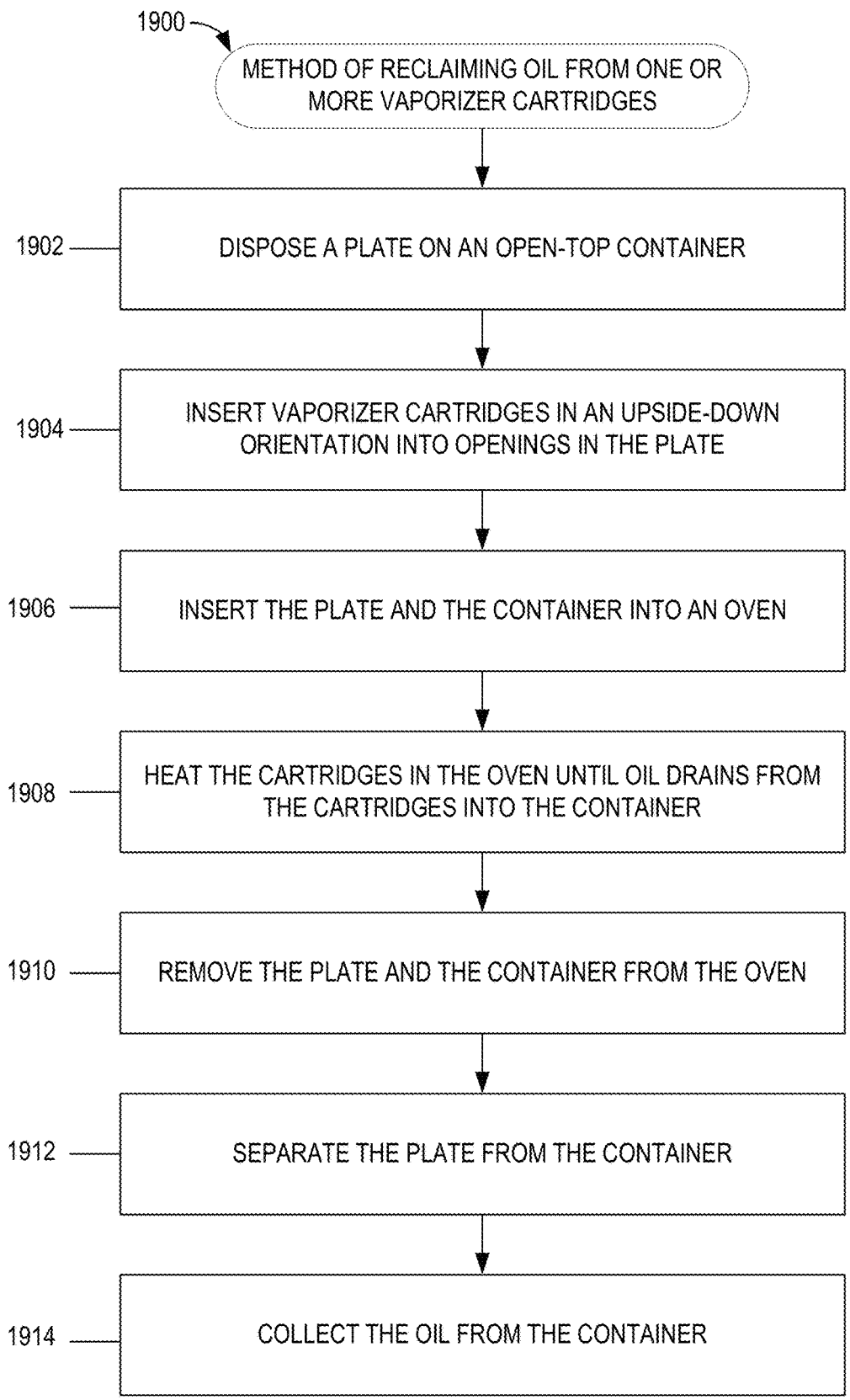
FIG. 19 is a flowchart representative of an example method of reclaiming oil from one or more vaporizer cartridges that can be implemented in connection with the example apparatus of FIG. 1 and/or FIG. 11.

FIG. 19 is an example flowchart representative of an example method 1900 of reclaiming oil from one or more vaporizer cartridges. The example method 1900 is disclosed in connection with the example apparatus 100. However, the example method 1900 can be similarly performed with the example apparatus 1100 of FIGS. 11-18. The example method 1900 can be performed manually by one or more persons and/or by one or more automated machines. Any of the steps, illustrated by the blocks, in FIG. 19 can be repeated, combined, removed, and/or rearranged.

At block 1902, the plate 102 is disposed on the container 700, as shown in FIG. 9A.

Prior to inserting the vaporizer cartridges into the plate 102, a user may remove the mouthpieces of the vaporizer cartridges using the example post 1602 and pliers 1700 disclosed in connection with the process described in FIGS. 14-18. For example, a user may couple (e.g., by screwing)

a vaporizer cartridge, such as the vaporizer cartridge 800, into the threaded opening 1400. Then, the user removes the mouthpiece 808 from the reservoir casing 802 while the vaporizer cartridge 800 is screwed into the threaded opening 1400. For example, the user may insert the post 1602 into one of the openings 1110, and then use a tool such as the pliers 1700 to remove the mouthpiece 808 by positioning the pliers 1700 on a top end of the post 1602 and using the post 1602 as a leverage point. After the mouthpiece 808 is removed from the reservoir casing 802, the user can unscrew or otherwise decouple the vaporizer cartridge 800 from the threaded opening 1400.

At block 1904, one or more vaporizer cartridges are inserted in an upside-down orientation into respective ones of the openings 116 in the plate 102, as shown in FIG. 9B. In some examples, inserting the vaporizer cartridges includes engaging the vaporizer cartridges with the shoulders 400 in the openings 116. Then, the cartridges can be heated. For example, at block 1906, the plate 102 (along with the cartridge(s)) and the container 700 are inserted into the oven 902, as shown in FIG. 9D. At block 1908, the oven 902 heats the cartridge(s) and the oil in the cartridge(s) drains into the container 700. In some examples, the cartridge(s) is/are left in the oven 902 at a certain temperature for a certain period of time, such as, for example at 180° F. (82.2° C.) for 20 minutes.

At block 1910, the plate 102 (and the cartridge(s)) and the container 700 are removed from the oven 902. At block 1912, the plate 102 is separated from the container 700. The oil from the cartridge(s) has collected in the cavity 702 of the container 700. Then, at block 1914, the oil can be collected from the container 700. For example, a person can collect the oil using a syringe or other collection device. The person can then inject the oil into another cartridge (e.g., a new cartridge or a previously used cartridge).

Figure 20:
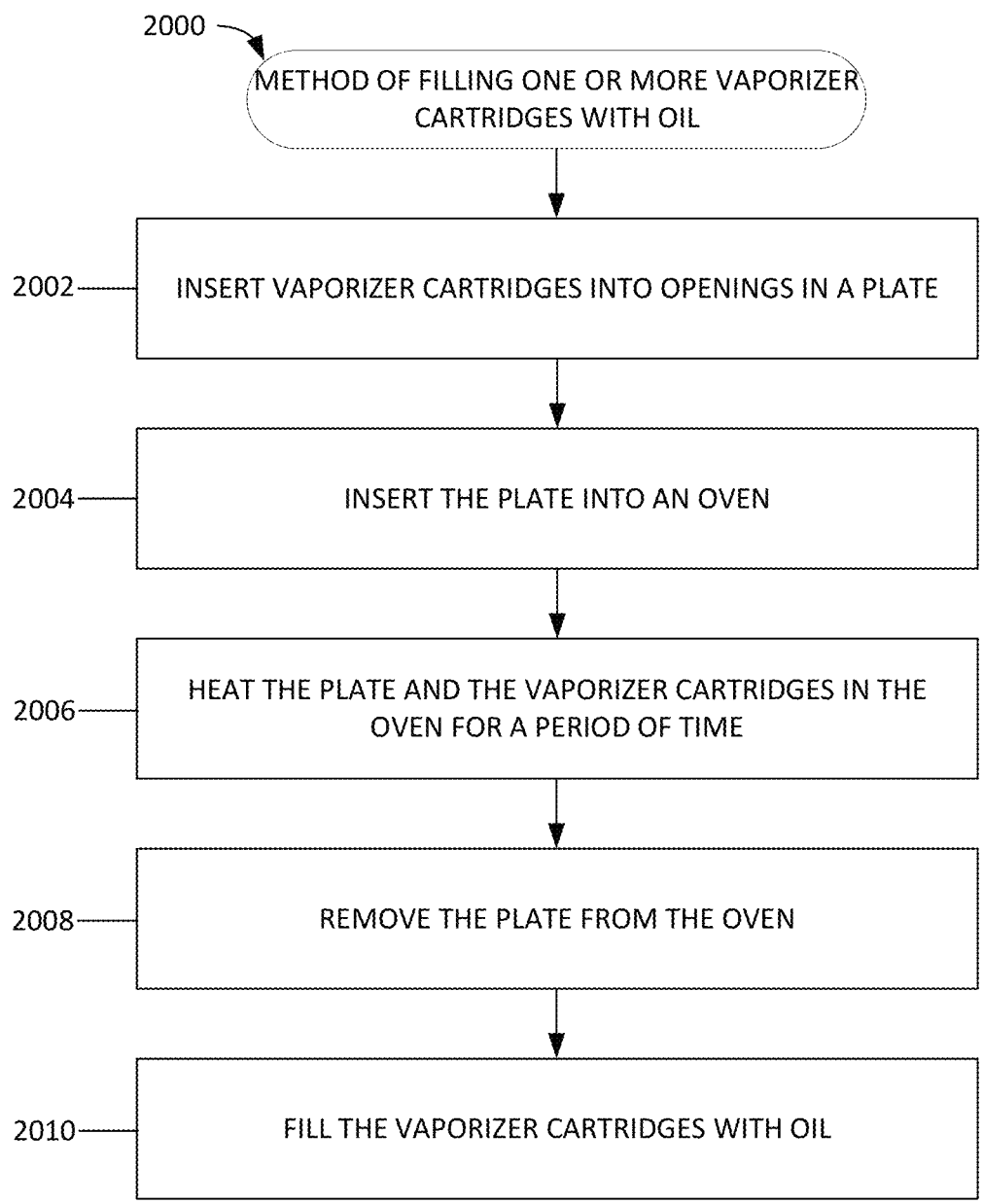
FIG. 20 is a flowchart representative of an example method of filling one or more vaporizer cartridges that can be implemented in connection with the example apparatus of FIG. 1 and/or FIG. 11.

FIG. 20 is an example flowchart representative of an example method 2000 of filling one or more vaporizer cartridges. The example method 2000 is disclosed in connection with the example apparatus 100. However, the example method 2000 can be similarly performed with the example apparatus 1100 of FIGS. 11-18. The example method 2000 can be performed manually by a person and/or by one or more automate machines. Any of the steps, illustrated by the blocks, in FIG. 20 can be repeated, combined, removed, and/or rearranged.

At block 2002, one or more vaporizer cartridge(s) are inserted into the openings 116 in the plate 102, as shown in FIG. 10A. Then, the plate 102 and the cartridge(s) are heated. For example, at block 2004, the plate 102 (with the cartridge(s)) is inserted into an oven, such as the oven 902. At block 2006, the plate 102 and the cartridges are heated in the oven for a period of time. At block 2008, the plate (with the cartridge(s)) is removed from the oven. At block 2010, a person can fill the cartridge(s) with oil. The warmed cartridge(s) and the plate 102 helps the oil settle more evenly in the cartridges and helps reduce or prevent air bubbles.

While in some examples the cartridges are heated in the oven with the plate 102, in other examples, the plate 102 can be heated by itself in the oven without the cartridges. For example, the plate 102 can be heated for a period of time in the oven by itself. Then, the plate 102 can be removed from the oven, and then the cartridges can be inserted into the openings 116. The heated plate 102 warms the cartridges to help settle the oil during the filling process.

In some examples, the same plate 102 can be used for both reclamation purposes and filling purposes. For example, the plate 102 can be used in connection with an oil reclamation process as disclosed in connection with FIG. 19. The plate 102 can also be used in connection with a filling process as disclosed in connection with FIG. 20.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, methods, apparatus, and articles of manufacture have been disclosed that enable oil to be easily reclaimed from one or more vaporizer cartridges. As such, the oil can be saved and re-used, which saves manufacturers and/or users money by not wasting or having to dispose of cartridge with oil. Examples have also been disclosed that improve the efficiency of the filling process.

Examples and example combinations disclosed herein include the following:

Example 1 is an apparatus for reclaiming oil from one or more vaporizer cartridges. The apparatus includes a plate having a top side, a bottom side opposite the top side, and a plurality of openings extending through the plate between the top side and the bottom side. A portion of respective ones of the openings sized to receive a vaporizer cartridge such that the vaporizer cartridge can be inserted into the opening in an upside-down orientation. The plate also has a shoulder formed in respective ones of the openings to be engaged by a top end of the vaporizer cartridge and to support the vaporizer cartridge.

Example 2 includes the apparatus of Example 1, further including an open-top container. The plate is to be disposed on the container such that oil from the vaporizer cartridge can be drained into the container.

Example 3 includes the apparatus of Example 2, wherein the plate has an extended portion extending from the bottom side. The openings extending through the extended portion. The extended portion is sized to be received in the container when the plate is disposed on the container.

Example 4 includes the apparatus of any of Examples 1-3, where in the plate has a first edge, a second edge opposite the first edge, a first recess extending into the bottom side along the first edge, and a second recess extending into the bottom side along the second edge. The first and second recesses form handle portions.

Example 5 includes the apparatus of any of Examples 1-4, wherein the portion of respective ones of the openings is sized to receive a 510 cartridge.

Example 6 includes the apparatus of Example 5, wherein the portion of respective ones of the openings has a diameter of about 0.425 inches.

Example 7 includes the apparatus of any of Examples 1-6, wherein the portion of respective ones of the openings is a first portion that extends from the top side of the plate to the shoulder. A second portion of respective ones of the openings extend from the shoulder to the bottom side of the plate.

Example 8 includes the apparatus of Example 7, wherein the first portion has a first diameter and the second portion has a second diameter than that is less than the first diameter.

Example 9 includes the apparatus of any of Examples 1-8, wherein the plate includes aluminum.

Example 10 includes the apparatus of any of Examples 1-9, wherein the openings are spaced equidistant from each other.

Example 11 includes the apparatus of any of Examples 1-10, wherein the plate is cuboid shaped.

Example 12 includes the apparatus of Example 11, wherein the openings are arranged in a grid pattern.

Example 13 includes the apparatus of any of Examples 1-10, wherein the plate is disc shaped.

Example 14 includes the apparatus of Example 13, wherein the openings are arranged in a circular pattern around a center of the plate.

Example 15 is a method including disposing a plate on an open-top container. The plate has a top side, a bottom side, and a plurality of the openings extending through the plate between the top side and the bottom side. The method includes inserting vaporizer cartridges upside-down into respective ones of the openings in the plate, heating the vaporizer cartridges such that oil from the vaporizer cartridges drains into the container, separating the plate from the container, and collecting the oil from the container.

Example 16 includes the method of Example 15, wherein heating the vaporizer cartridges includes inserting the plate, the vaporizer cartridges, and the container into an oven, heating the plate, the vaporizer cartridges, and the container in the oven for a period of time, and removing the plate, the vaporizer cartridges and the container from the oven.

Example 17 includes the method of Examples 15 or 16, wherein the plate has a shoulder formed in each of the openings, and wherein the inserting of the vaporizer cartridges includes engaging the vaporizer cartridges with the shoulders.

Example 18 is a method including inserting vaporizer cartridges into openings in a plate, heating the plate and the vaporizer cartridges, and, after heating the plate and the vaporizer cartridges, filling the vaporizer cartridges with oil.

Example 19 includes the method of Example 18, wherein heating the plate and the vaporizer cartridges includes inserting the plate and the vaporizer cartridges into an oven, heating the plate and the vaporizer cartridges in the oven for a period of time, and removing the plate and the vaporizer cartridges from the oven.

Example 20 includes the method of Examples 18 and 19, wherein the plate has a shoulder formed in each of the openings, and wherein the inserting of the vaporizer cartridges into the openings includes engaging the vaporizer cartridges with the shoulders.

Example 21 is an apparatus for reclaiming oil from one or more vaporizer cartridges. The apparatus includes a plate having a top side, a bottom side opposite the top side, and a threaded opening extending into the top side of the plate. The threaded opening is sized to receive a threaded extension on a vaporizer cartridge such that the vaporizer cartridge can be screwed into the threaded opening and held on the plate while a mouthpiece of the vaporizer cartridge is removed. The plate also has a drain opening extending through the plate between the top side and the bottom side. At least a portion of the drain opening is sized to receive a reservoir casing of the vaporizer cartridge such that the reservoir casing can be inserted into the drain opening in an upside-down orientation.

Example 22 includes the apparatus of Example 21, further including a post having a diameter smaller than the drain opening. The post is to be removably inserted into the drain opening to be used as a leverage support for a tool when removing the mouthpiece from the vaporizer cartridge.

Example 23 includes the apparatus of Example 22, wherein the post is constructed of metal.

Example 24 includes the apparatus of Examples 22 or 23, wherein the post is a first post, the apparatus further including a second post that is longer than the first post.

Example 25 includes the apparatus of any of Examples 21-24, wherein the drain opening is non-threaded.

Example 26 includes the apparatus of any of Examples 21-25, further including an open-top container, the plate to be disposed on the container such that oil from the vaporizer cartridge can be drained into the container.

Example 27 includes the apparatus of Example 26, wherein the plate has an extended portion extending from the bottom side, the drain opening extending through the extended portion, the extended portion sized to be received in the container when the plate is disposed on the container.

Example 28 includes the apparatus of Example 27, wherein the threaded opening extends through the plate between the top side and the bottom side.

Example 29 includes the apparatus of Example 28, wherein the threaded opening is disposed outside of the extended portion.

Example 30 includes the apparatus of any of Examples 21-29, wherein the plate is disc shaped.

Example 31 includes the apparatus of Example 30, wherein the plate has a plurality of drain openings, wherein the plurality of drain openings are arranged in a circular pattern around a center of the plate, and wherein the threaded opening is disposed outside of the circular pattern.

Example 32 includes the apparatus of any of Examples 21-31, wherein the threaded opening has a diameter that is less than a diameter of the portion of the drain opening.

Example 33 includes the apparatus of any of Examples 21-32, wherein the portion of the drain opening is a first portion that extends from the top side of the plate to a shoulder, a second portion of the drain opening extends from the shoulder to the bottom side of the plate.

Example 34 includes the apparatus of Example 33, wherein the first portion has a first diameter and the second portion has a second diameter than that is less than the first diameter.

Example 35 includes the apparatus of any of Examples 21-34, wherein the plate is constructed of aluminum.

Example 36 is an apparatus for reclaiming oil from one or more vaporizer cartridges. The apparatus includes a plate having a top side, a bottom side opposite the top side, means for coupling a vaporizer cartridge to the plate, and a drain opening extending through the plate between the top side and the bottom side, at least a portion of the drain opening sized to receive a reservoir casing of the vaporizer cartridge such that the reservoir casing can be inserted into the drain opening in an upside-down orientation. The apparatus also includes a post to be releasably coupled to the plate, the post to be used as a leverage support for a tool when removing the mouthpiece from the vaporizer cartridge.

Example 37 includes the apparatus of Example 36, wherein the post has a smaller diameter than the drain opening such that the post can be removably inserted into the drain opening.

Example 38 includes the apparatus of Examples 36 or 37, wherein the post is cylindrical.

Example 39 includes the apparatus of any of Examples 36-38, wherein the post is constructed of metal.

Example 40 includes the apparatus of any of Examples 36-39, wherein the post is a first post, the apparatus further including a second post that is longer than the first post.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for reclaiming oil from one or more vaporizer cartridges, the apparatus comprising:
   a plate having:
      a top side;
      a bottom side opposite the top side;
      a threaded opening extending into the top side of the plate, the threaded opening being sized to receive a threaded extension on a vaporizer cartridge such that the vaporizer cartridge can be screwed into the threaded opening and held on the plate while a mouthpiece of the vaporizer cartridge is removed; and
      a drain opening extending through the plate between the top side and the bottom side, at least a portion of the drain opening sized to receive a reservoir casing of the vaporizer cartridge such that the reservoir casing can be inserted into the drain opening in an upside-down orientation.

2. The apparatus of claim 1, wherein the drain opening is non-threaded.

3. The apparatus of claim 1, wherein the threaded opening has a diameter that is less than a diameter of the portion of the drain opening.

4. The apparatus of claim 1, wherein the plate is constructed of aluminum.

5. The apparatus of claim 1, wherein the plate is disc shaped.

6. The apparatus of claim 5, wherein the plate has a plurality of drain openings, wherein the plurality of drain openings are arranged in a circular pattern around a center of the plate, and wherein the threaded opening is disposed outside of the circular pattern.

7. The apparatus of claim 1, wherein the portion of the drain opening is a first portion that extends from the top side of the plate to a shoulder, a second portion of the drain opening extends from the shoulder to the bottom side of the plate.

8. The apparatus of claim 7, wherein the first portion has a first diameter and the second portion has a second diameter than that is less than the first diameter.

9. The apparatus of claim 1, further including a post having a diameter smaller than the drain opening, the post to be removably inserted into the drain opening to be used as a leverage support for a tool when removing the mouthpiece from the vaporizer cartridge.

10. The apparatus of claim 9, wherein the post is constructed of metal.

11. The apparatus of claim 9, wherein the post is a first post, the apparatus further including a second post that is longer than the first post.

12. The apparatus of claim 1, further including an open-top container, the plate to be disposed on the container such that oil from the vaporizer cartridge can be drained into the container.

13. The apparatus of claim 12, wherein the plate has an extended portion extending from the bottom side, the drain opening extending through the extended portion, the extended portion sized to be received in the container when the plate is disposed on the container.

14. The apparatus of claim 13, wherein the threaded opening extends through the plate between the top side and the bottom side.

15. The apparatus of claim 14, wherein the threaded opening is disposed outside of the extended portion.

16. An apparatus for reclaiming oil from one or more vaporizer cartridges, the apparatus comprising:
   a plate having:
      a top side;
      a bottom side opposite the top side;
      means for coupling a vaporizer cartridge to the plate; and
      a drain opening extending through the plate between the top side and the bottom side, at least a portion of the drain opening sized to receive a reservoir casing of the vaporizer cartridge such that the reservoir casing can be inserted into the drain opening in an upside-down orientation; and
   a post to be releasably coupled to the plate, the post to be used as a leverage support for a tool when removing a mouthpiece from the vaporizer cartridge.

17. The apparatus of claim 16, wherein the post has a smaller diameter than the drain opening such that the post can be removably inserted into the drain opening.

18. The apparatus of claim 16, wherein the post is cylindrical.

19. The apparatus of claim 16, wherein the post is constructed of metal.

20. The apparatus of claim 16, wherein the post is a first post, the apparatus further including a second post that is longer than the first post.

* * * * *